United States Patent
Farhan et al.

(10) Patent No.: US 12,465,607 B2
(45) Date of Patent: Nov. 11, 2025

(54) ALK INHIBITORS FOR TREATMENT OF ALK-NEGATIVE CANCER AND PLASMA CELL-MEDIATED DISEASES

(71) Applicant: UNIVERSITETET I OSLO, Oslo (NO)

(72) Inventors: Hesso Farhan, Oslo (NO); Ludvig Munthe, Fjellhamar (NO); Kjetil Tasken, Rykkinn (NO); Sigrid Skanland, Oslo (NO); Mariaserena Giliberto, Oslo (NO); Fredrik Hellem Schjesvold, Jar (NO); Christoph Driessen, St. Gallen (CH); Lenka Besse, St. Gallen (CH); Andrej Besse, St. Gallen (CH)

(73) Assignee: UNIVERSITETET I OSLO, Oslo (NO)

( * ) Notice: Subject to any disclaimer, the term of this patent is extended or adjusted under 35 U.S.C. 154(b) by 829 days.

(21) Appl. No.: 17/772,192

(22) PCT Filed: Mar. 12, 2020

(86) PCT No.: PCT/EP2020/056698
§ 371 (c)(1),
(2) Date: Apr. 27, 2022

(87) PCT Pub. No.: WO2021/083555
PCT Pub. Date: May 6, 2021

(65) Prior Publication Data
US 2022/0401444 A1    Dec. 22, 2022

(30) Foreign Application Priority Data
Oct. 28, 2019   (GB) .................................. 1915618

(51) Int. Cl.
| | |
|---|---|
| *A61K 31/506* | (2006.01) |
| *A61K 9/00* | (2006.01) |
| *A61P 35/02* | (2006.01) |

(52) U.S. Cl.
CPC .......... *A61K 31/506* (2013.01); *A61K 9/0053* (2013.01); *A61P 35/02* (2018.01)

(58) Field of Classification Search
CPC ............................... A61K 31/506; A61P 35/02
See application file for complete search history.

(56) References Cited

U.S. PATENT DOCUMENTS

| | | |
|---|---|---|
| 2015/0290204 A1 | 10/2015 | Sheng et al. |
| 2017/0173020 A1 | 6/2017 | Ballestrero et al. |
| 2017/0274074 A1 | 9/2017 | Das-Young et al. |
| 2017/0281624 A1 | 10/2017 | Peters et al. |
| 2018/0282415 A1* | 10/2018 | Lin .................... A61K 31/4545 |

FOREIGN PATENT DOCUMENTS

| | | |
|---|---|---|
| CN | 105294649 A | 2/2016 |
| CN | 105622577 A | 6/2016 |
| WO | 2008073687 A2 | 6/2008 |
| WO | 2009126514 A1 | 10/2009 |
| WO | 2010002655 A2 | 1/2010 |
| WO | 2012082972 A1 | 6/2012 |
| WO | 2016098042 A1 | 6/2016 |
| WO | 2016098070 A1 | 6/2016 |
| WO | 2017058780 A1 | 4/2017 |
| WO | 2019039390 A1 | 2/2019 |
| WO | 2019/113345 A1 | 6/2019 |
| WO | 2019141235 A1 | 7/2019 |

OTHER PUBLICATIONS

Notification of the First Office Action for Chinese Application No. 202080089754.2 dated Dec. 25, 2023 with English translation.
Jang Jaebong, et al.; "Discovery of a Potent Dual ALK and EGFR T790M Inhibitor"; Eur J Med Chem Aug. 2017; 136:497-510.
Du, Ping, et al.; "Current status of molecular targeted drugs for EML4-ALK-positive non-small cell lung cancer"; Chinese Journal of New Drugs 2015; 24(16):1856-1861.
Sun, Jingchun, et al.; "A systematic analysis of FDA-approved anticancer drugs"; BMC Systems Biology 2017; 11 (5):27-43.
Abramson, "The Multiple Myeloma Drug Pipeline—2018: A Review of Small Molecules and Their Therapeutic Targets," Clinical Lymphoma, Myeloma & Leukemia, 2018, 18(9):611-627.
Abramsom, "Monoclonal Antibodies for the Treatment of Multiple Myeloma: An Update," International Journal of Molecular Sciences, 2018, 19(12):3924.
Bagnara et al., "A novel adoptive transfer model of chronic lymphocytic leukemia suggests a key role for T lymphocytes in the disease," Blood, 2011, 117(20):5463-5472.
Bieghs et al., "The insulin-like growth factory system in multiple myeloma: diagnostic and therapeutic potential.," Oncotarget, 2016, 7(30):48732-48752.
Caron et al., "CXCR4 Expression Functionally Discriminates Centroblasts versus Centrocytes within Human Germinal Center B Cells," The Journal of Immunology, 2009, 182(12):7595-7602.
Centonze et al., "LTK is an ER-resident receptor tyrosine kinase that regulates secretion," The Journal of Cell Biology, 2019, 218(8):2470-2480.
Chand et al., "Cell culture and *Drosophila* model systems define three classes of anaplastic lymphoma kinase mutations in neuroblastoma," Disease Models & Mechanisms, 2013, 6(2):373-382.

(Continued)

*Primary Examiner* — Sarah Pihonak
*Assistant Examiner* — Mikhail O'Donnel Robinson
(74) *Attorney, Agent, or Firm* — Heslin Rothenberg Farley & Mesiti P.C.

(57) ABSTRACT

The present invention provides a method of treating ALK-negative/LTK-positive cancer in a subject, comprising administering to the subject a pharmaceutically-effective dose of a linear inhibitor of ALK. The invention is of particular utility in treating multiple myeloma, including proteasome inhibitor-resistant multiple myeloma.

12 Claims, 9 Drawing Sheets

(56) References Cited

OTHER PUBLICATIONS

Clinical Trial: TAPUR: Testing the Use of Food and Drug Administration (FDA) Approved Drugs That Target a Specific Abnormality in a Tumor Gene in People With Advanced Stage Cancer, NCT02693535, U.S. National Library of Medicine, first posted Feb. 26, 2016, downloaded from internet URL https://clinicaltrials.gov/ct2/show/NCT02693535.

Darwiche et al., "Chronic Lymphocytic Leukemia B-Cell Normal Cellular Counterpart: Clues From a Functional Perspective," Frontiers in Immunology, 2018, 9(683).

Davies et al., "Molecular Pathways—ROS1 Fusion Proteins in Cancer," Clinical Cancer Research, 2013, 19 (15):4040-4045.

Davies et al., "Identifying and Targeting ROS1 Gene Fusions in Non-Small Cell Lung Cancer," Clinical Cancer Research, 2012, 18(17):4570-4579.

Facchinetti et al., "Lorlatinib in ALK- and ROS1-positive NSCLC: the future has a start," Translational lung cancer, 2018, 7(2):S103-S106.

Hall et al., "Rh autoantigen presentation to helper T cells in chronic lymphocytic leukemia by malignant B cells," Blood, 2005, 105(5):2007-2015.

Hallberg et al., "The role of the ALK receptor in cancer biology," Annals of Oncology, 2016, 27(3):iii4-iii15.

Herold et al., "An eight-gene expression signature for the prediction of survival and time to treatment in chronic lymphocytic leukemia . . . " Leukemia, 2011, 25:1639-1645.

Hsiao et al., "Detection of Tumor NTRK Gene Fusions to Identify Patients Who May Benefir from Tyrosine Kinase (TRK) Inhibitor Therapy," The Journal of Molecular Diagnostics, 2019, 21(4):553-571.

Jourdan et al., "An in vitro model of differentiation of memory B cells into plasmablasts and plasma cells including detailed phenotypic and molecular characterization," Blood, 2009, 114(25):5173-5181.

Jourdan et al., "Characterization of a Transitional Preplasmablast Population in the Process of Human B Cell to Plasma Cell Differentiation," Journal of Immunology, 2011, 187(8):3931-3941.

Jourdan et al., "IL-6 supports the generation of human long-lived plasma cells in combination with either April or stromal cell-soluble factors," Leukemia, 2014, 28(8): 1647-1657.

Kamande et al., "Isolation of Circulating Plasma Cells from Blood of Patients Diagnosed with Clonal Plasma Cell Disorders using Cell Selection Microfluidics," Integrative Biology (Camb), 2018, 10(2):82-91.

Kazandjian et al., "Multiple myeloma epidemiology and survival: A unique malignancy," Seminars in Oncology, 2016, 43(6):676-681.

Kuenzi et al., "Polypharmacology-based ceritinib repurposing using integrated functional proteomics," Nature Chemical Biology, 2017, 13(12):1222-1231.

Lovly et al., "Inflammatory Myofibroblastic Tumors harbor multiple potentially actionable kinase fusions," Cancer Discovery, 2014, 4(8):889-895.

Monacco et al., "RNA-Seq Signatures Normalized by mRNA Abundance Allow Absolute Deconvolution of Human Immune Cell Types," Cell Reports, 2019,26(6):1627-1640.

Moreau et al., "Proteasome inhibitors in multiple myeloma: 10 years later," Blood, 2012, 120(5):947-959.

Morgan et al., "Kinase domain activation through gene rearrangement in multiple myeloma," Leukemia, 2018, 32 (11):2435-2444.

Os et al., "Chronic Lymphocytic Leukemia Cells Are Activated and Proliferate in Response to Specific T Helper Cells," Cell Reports, 2013, 4(3):566-577.

Oslowski et al., "Measuring ER Stress and the Unfolded Protein Response Using Mammalian Tissue Culture System," Methods in Enzymology, 2011, 490:71-92.

Patel et al., "ALK inhibitors and checkpoint blockade: a cautionary tale of mixing oil with water?," Journal of Thoracic Disease, 2018, 10(18):S2198-S2201.

Patten et al., "CD38 expression in chronic lymphocytic leukemia is regulated by the tumor microenvironment," Blood, 2008, 111(10):5173-5181.

Pulford et al., "Detection of Anaplastic Lymphoma Kinase (ALK) and Nucleolar Protein Nucleophosmin (NPM)-ALK Proteins in Normal and Neoplastic Cells With the Monoclonal Antibody ALK1," Blood, 1997, 89(4):1394-1404.

Schmiedel et al., "Impact of genetic polymorphisms on human immune cell gene expression," Cell, 2018, 175 (6):1701-1715.

Shaw et al., "Effect of crizotinib on overall survival in patients with advanced non-small-cell lung cancer harbouring ALK gene rearrangement: a retrospective analysis," Lancet Oncology, 2011, 12(11):1004-1012.

Soriano et al., "Proteasome inhibitor-adapted myeloma cells are largely independent from proteasome activity and show complex proteomic changes, in particular in redox and energy metabolism," Leukemia, 2016, 30:2198-2207.

Stutz et al., "Crizotinib inhibits migration and expression of ID1 in MET-positive lung cancer cells: implications for MET targeting in oncology," Future Oncology, 2014, 10(2):211-217.

Wallington-Beddoe et al., "Resistance to proteasome inhibitors and other targeted therapies in myeloma," British Journal of Haematology, 2018, 182(1):11-28.

Yadav et al., "Quantitative scoring of differential drug sensitivity for individually optimized anticancer therapies," Science Reports, 2014, 4:51935.

Zhang et al., "Repurposing Brigatinib for the Treatment of Colorectal Cancer Based on Inhibition of ER-phagy," Theranostics, 2017, 9(17), 4878-4892.

\* cited by examiner

Figure 1. LTK Knockdown Results in ER Stress
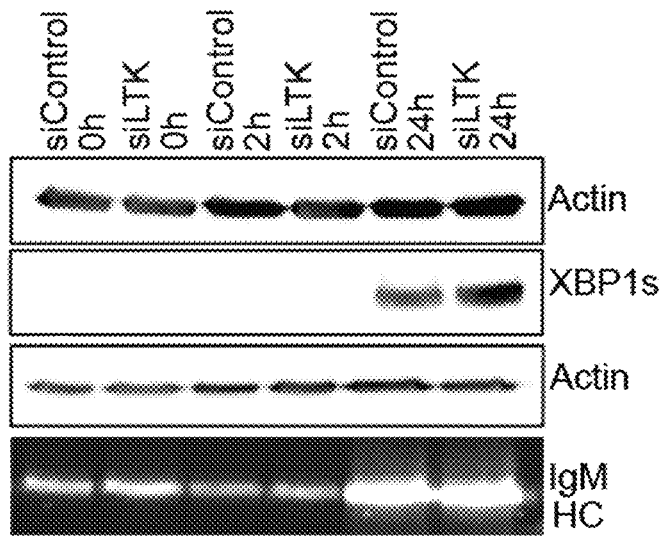
Figure 2. LTK Allows Cells to Cope with High Secretory Load.
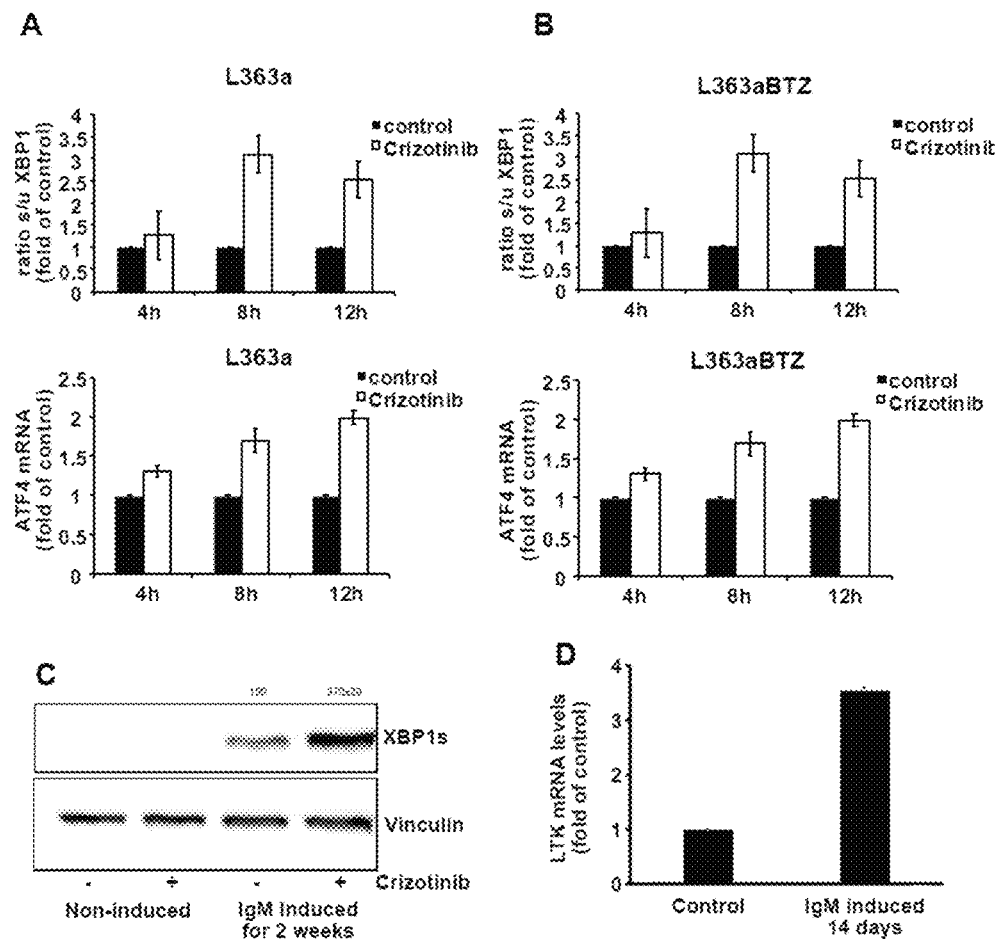

Figure 3. ALK$^{Neg}$LTK$^{Pos}$ Cells are Susceptible to Crizotinib Treatment and Undergo Apoptosis
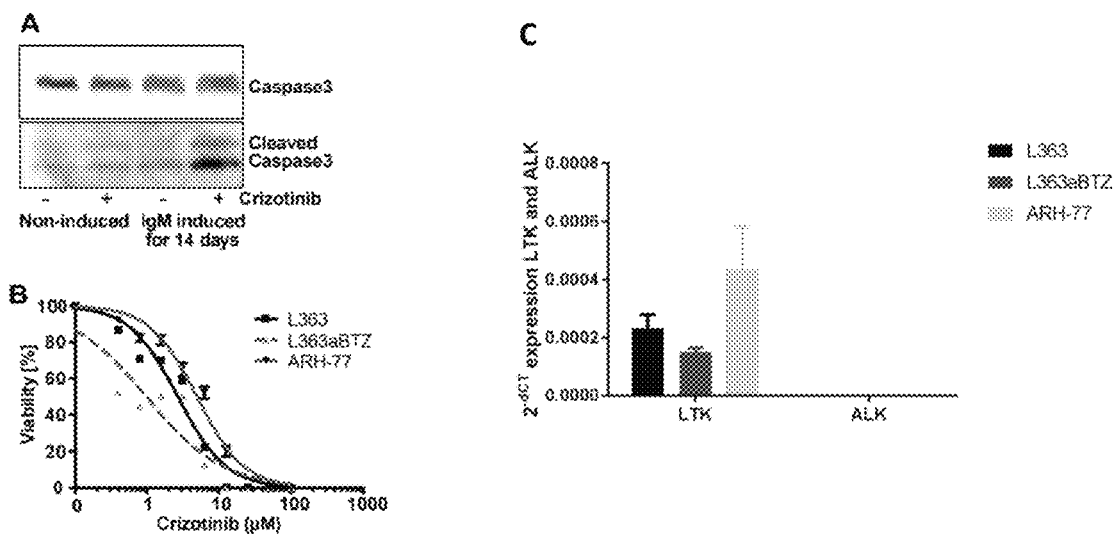
Figure 4. ALK$^{Neg}$LTK$^{Pos}$ Cell Lines are Susceptible to ALK Inhibitor Treatment
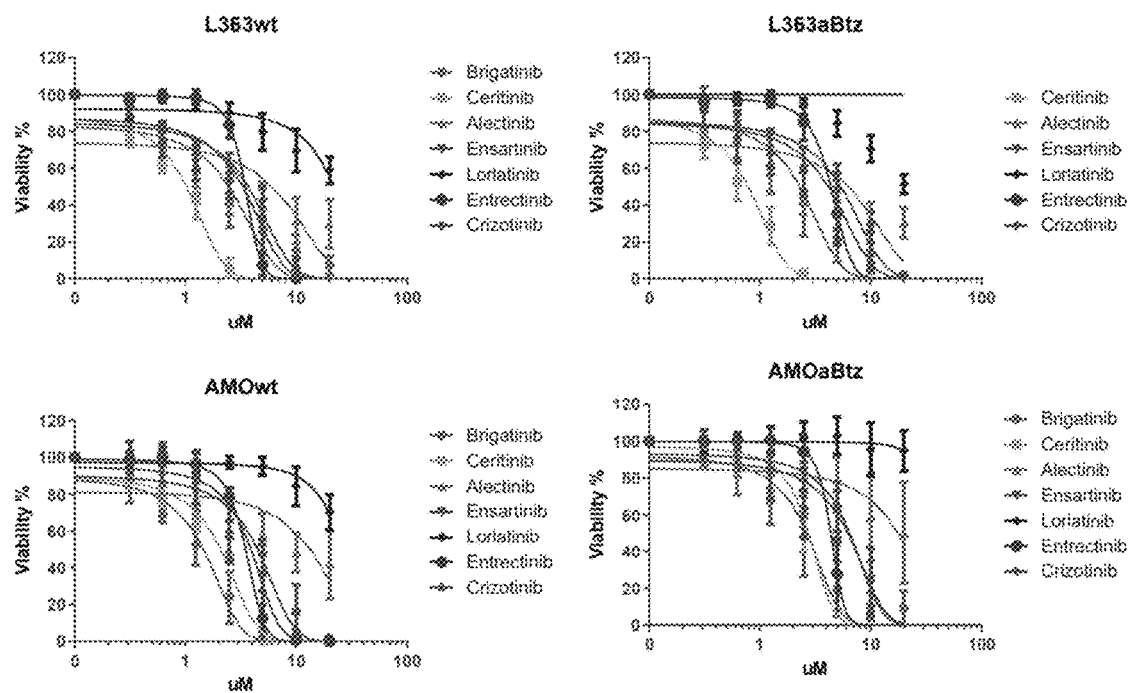

Figure 5. LTK Regulates Secretion, and Linear ALK Inhibitors Reduce Secretion
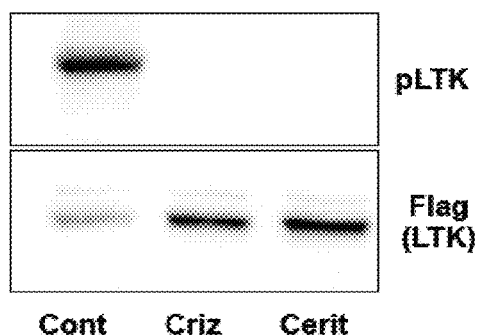
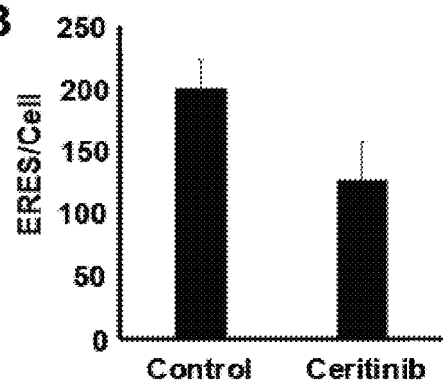
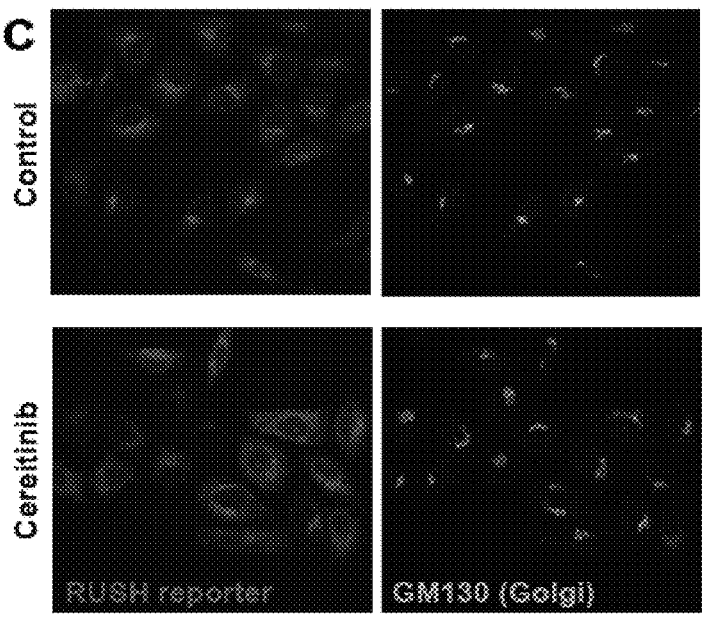
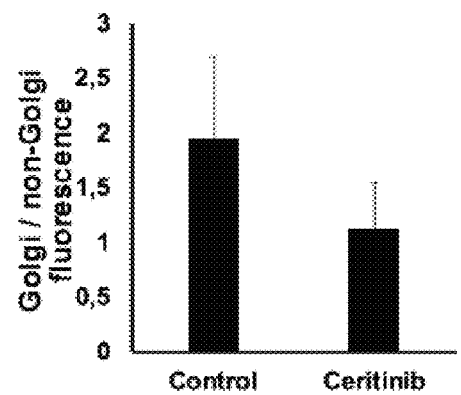
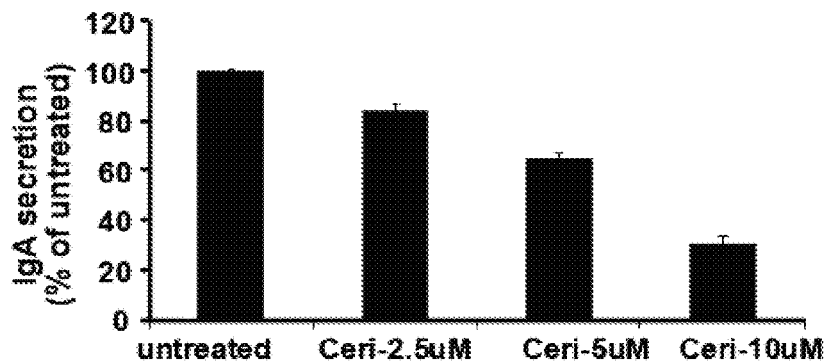

Figure 6. Multiple Myeloma Cells from Patients are Susceptible to Crizotinib Treatment
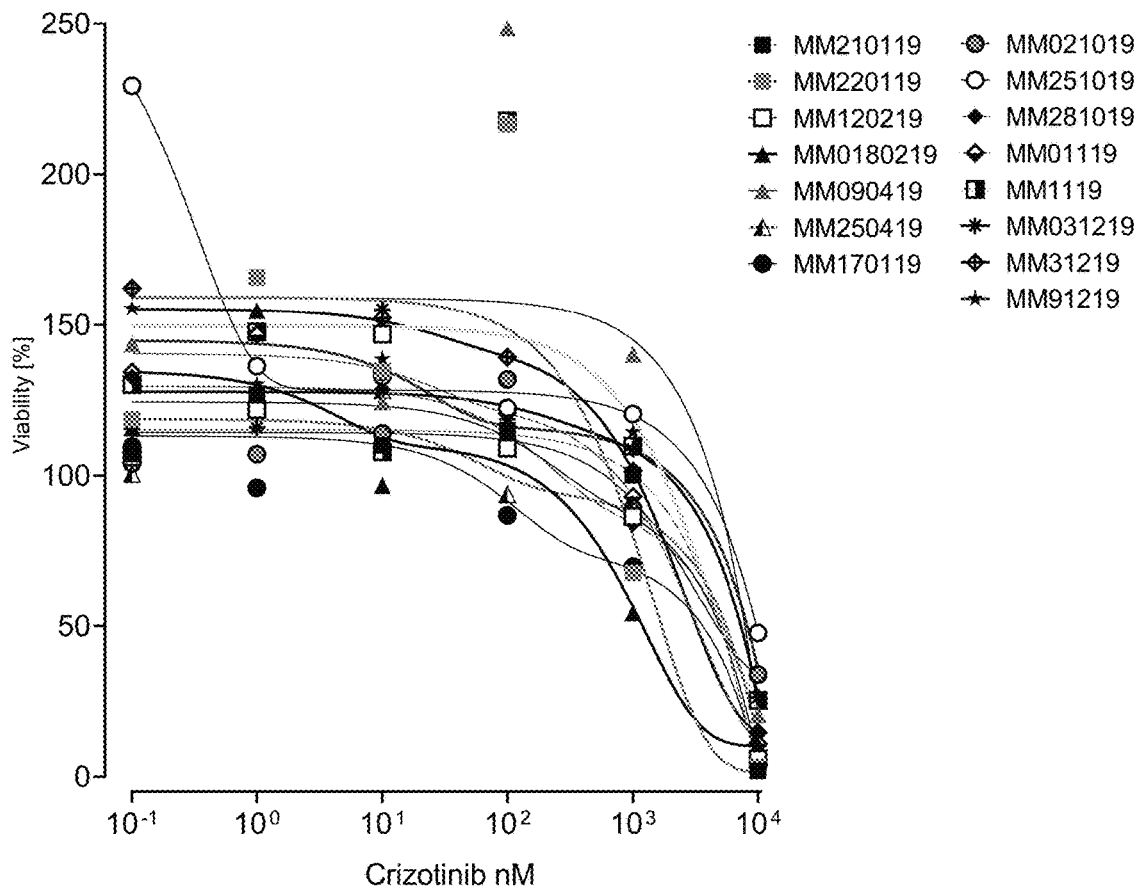
Figure 7. LTK and ALK Expression in Multiple Myeloma Cells from Myeloma Patients: 83 % of Multiple Myeloma Cells are ALK$^{Neg}$LTK$^{Pos}$
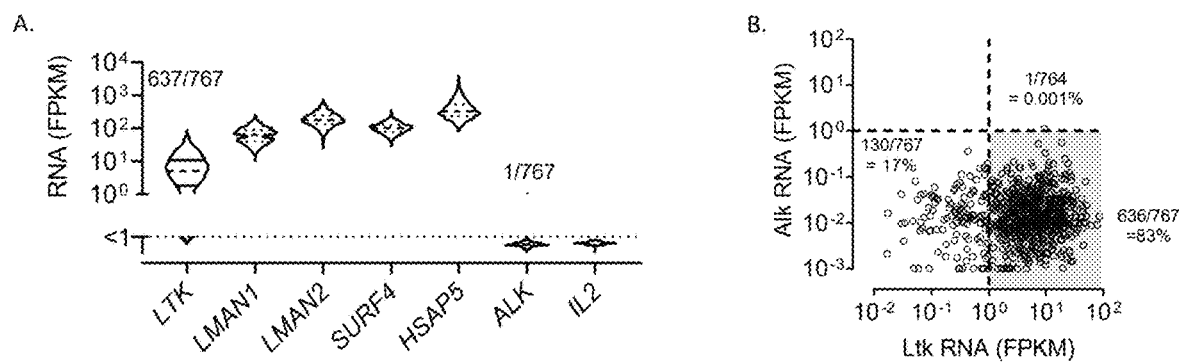

Figure 8. Xenografted Human Multiple Myeloma Cells in NSG Mice are Susceptible to Crizotinib
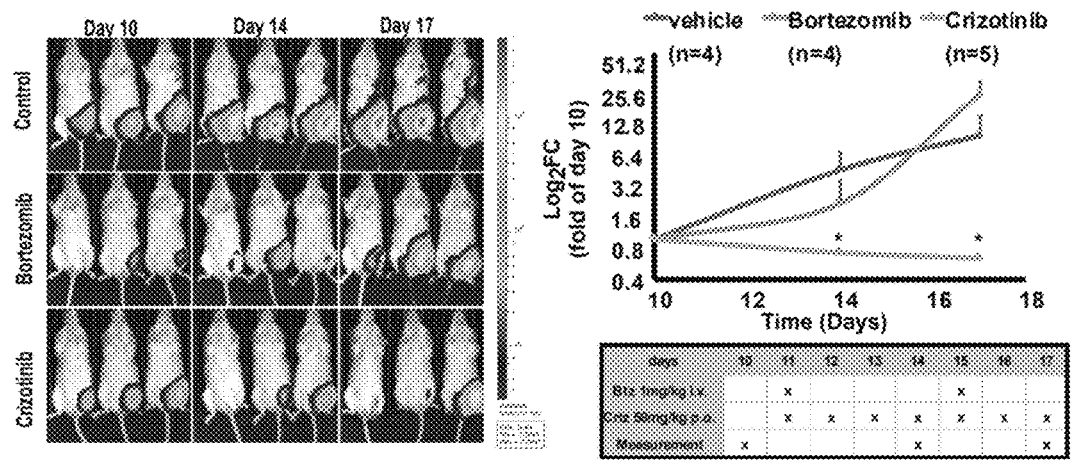
Figure 9. Expression of LTK and ALK in Chronic Lymphocytic Leukemia (CLL) Cells: 88 % are ALK$^{Neg}$LTK$^{Pos}$
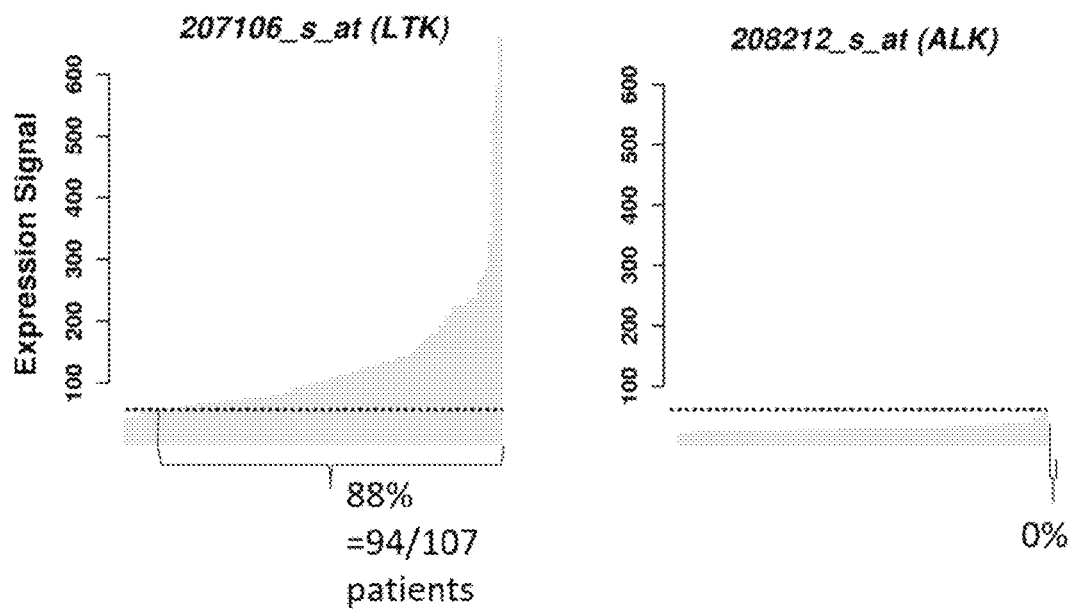

Figure 10. CLL Cells from Patients are Susceptible to Crizotinib
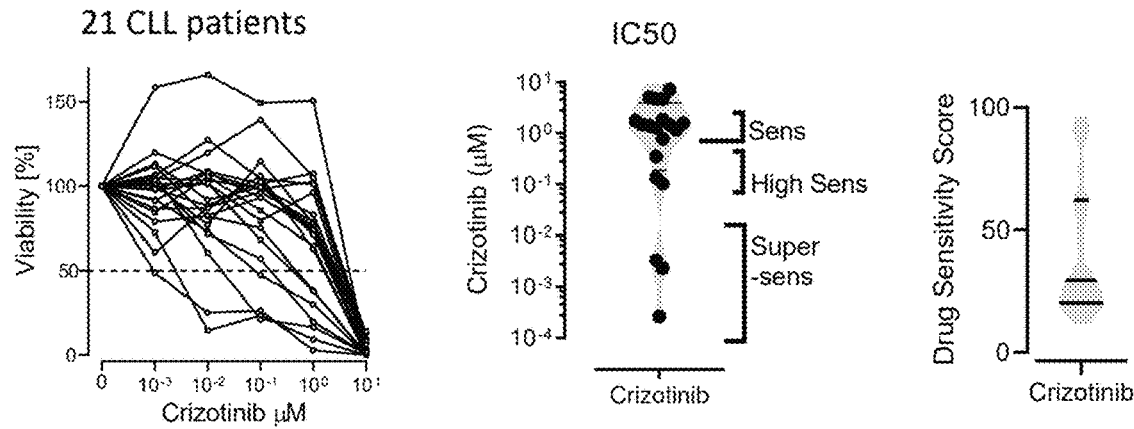
Figure 11. CLL Cells from IgVH$^{Unmut}$ Patients are Susceptible to Crizotinib
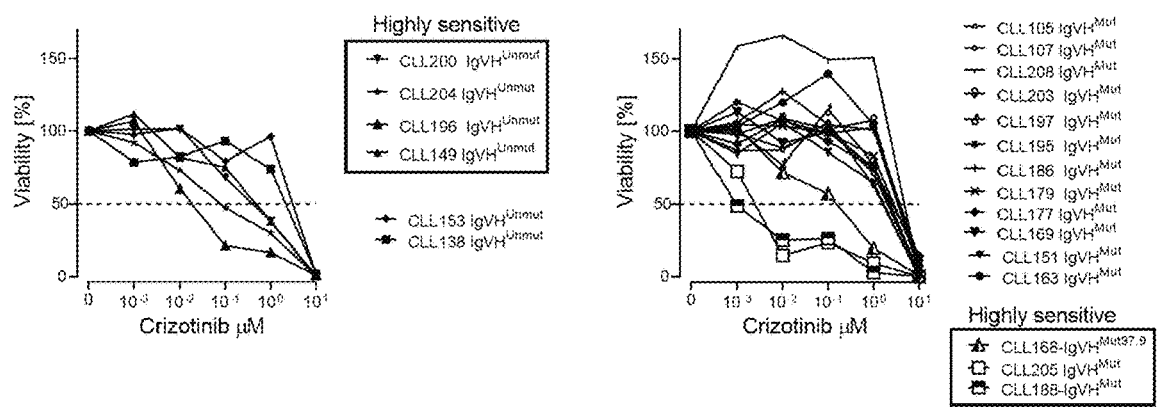
Figure 12. CLL Cells from Patients are Susceptible to ALK Inhibitor Treatment
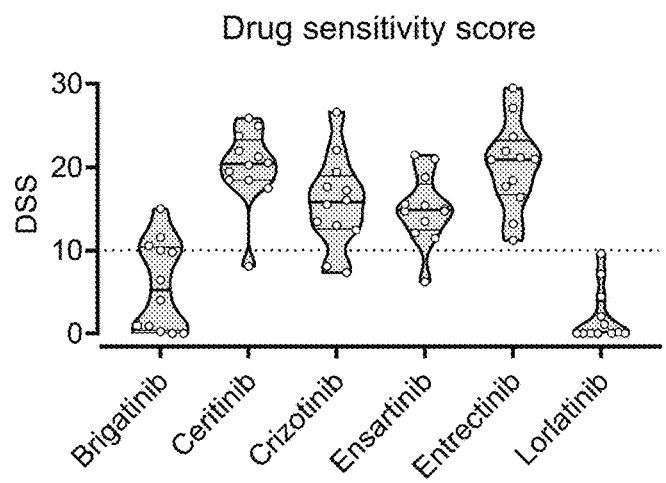

Figure 13. Expression of LTK and ALK in B Cell Differentiation: Memory B Cells and Plasma cells were ALK$^{Neg}$LTK$^{Pos}$
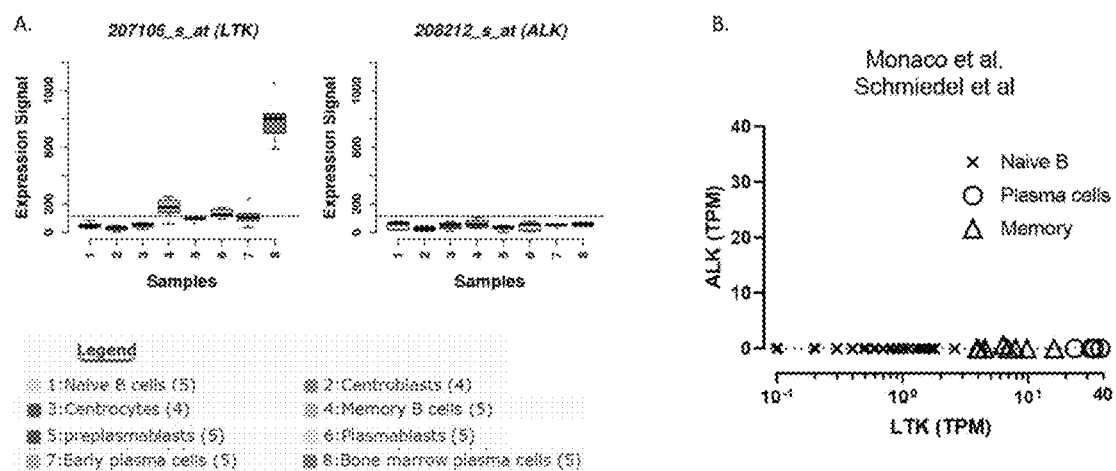
Figure 14. *In Vitro*-Generated Plasma Cells are Sensitive to Crizotinib
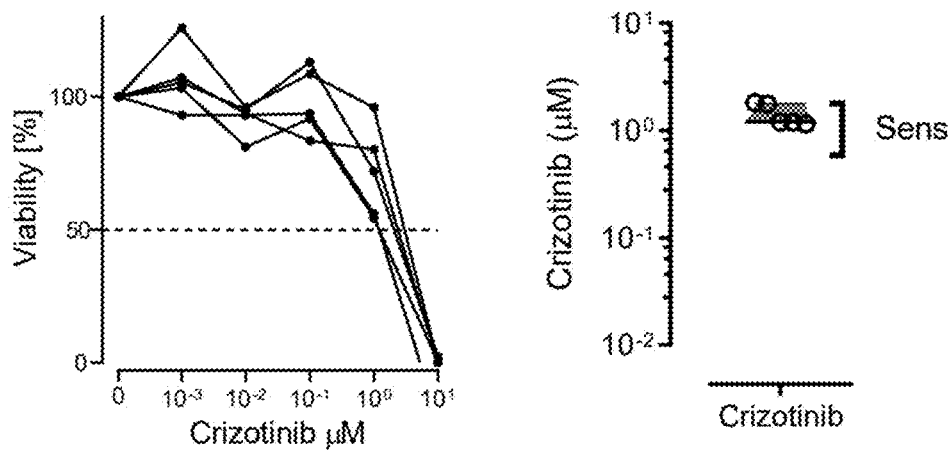

Figure 15. *In Vitro*-Generated Plasma Cells are Sensitive to the Linear ALK Inhibitors Crizotinib and Ceritinib
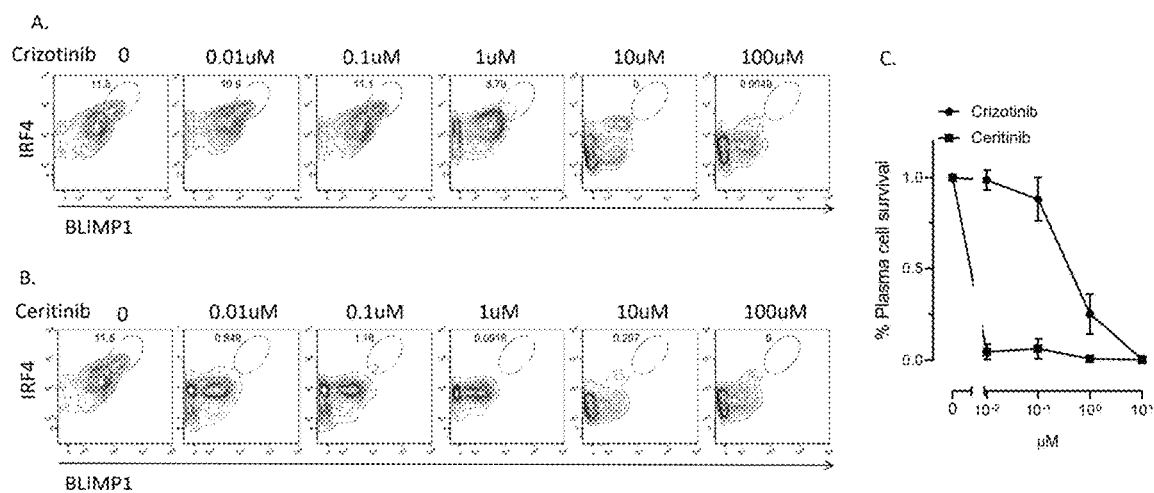
Figure 16. Plasma Cells are Sensitive to Crizotinib *in Vivo*, and Reduced the Secretion of Ig *in Vitro*
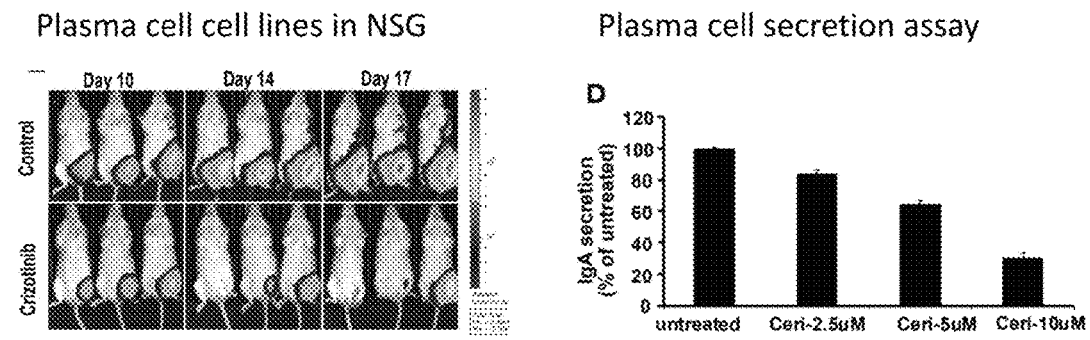

Figure 17. Liver Hepatocellular Carcinoma are ALK$^{Neg}$LTK$^{Pos}$ and are Sensitized to Apoptosis by Crizotinib
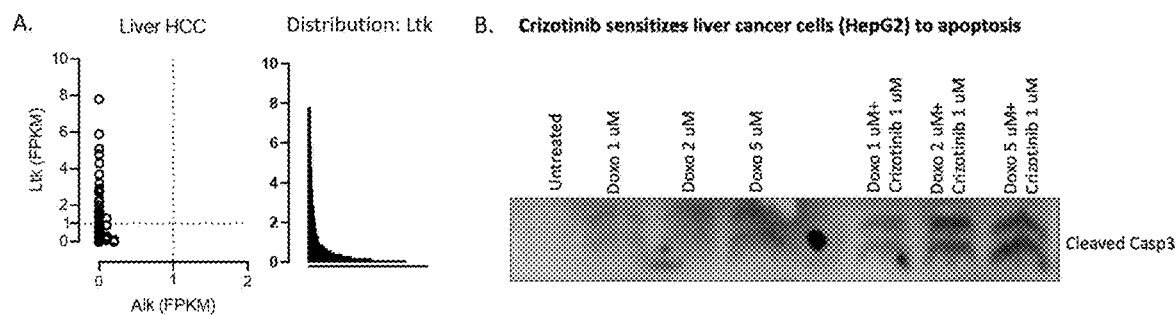

ALK INHIBITORS FOR TREATMENT OF ALK-NEGATIVE CANCER AND PLASMA CELL-MEDIATED DISEASES

CROSS REFERENCE TO RELATED APPLICATIONS

This application is national stage filing under section 371 of international Application No. PCT/EP2020/056698, filed on Mar. 12, 2020, and published on May 6, 2021, as WO 2021/083555, and claims priority to GB Application No. 1915618.1, filed on Oct. 29, 2019. The entire contents of WO2021/083555 are hereby incorporated herein by reference in its entirety.

The present invention provides a linear anaplastic lymphoma kinase (ALK) inhibitor for use in the treatment of ALK-negative and leukocyte tyrosine kinase (LTK)-positive cancer in humans ($ALK^{Neg}LTK^{Pos}$ target cells). The present invention also provides a linear ALK inhibitor for use in the treatment in humans of a plasma cell-mediated disease characterised by ALK-negative and LTK-positive plasma cells. The plasma cell-mediated disease treated according to the invention may in particular be an autoimmune disease characterised by the production of autoantibodies.

Anaplastic lymphoma kinase (ALK) is a receptor tyrosine kinase (RTK) belonging to the insulin receptor superfamily. In healthy adults, the ALK protein is expressed only in the central nervous system, at low levels (Pulford et al. Blood 89: 1394-1404, 1997). However, aberrant ALK expression has been reported in many cancers, as reviewed in Hallberg & Palmer, 2016 (Annals of Oncology 27 (Supplement 3): iii4-iii15). ALK fusion proteins have been reported to be expressed in several cancers. ALK has been found to form fusions with a variety of proteins, including notably NPM (in e.g. anaplastic large cell lymphoma) and EML4 (in e.g. non-small cell lung cancer (NSCLC)). Oncogenic ALK fusions include the kinase domain of the ALK protein, and are ligand independent (i.e. the ALK domain is constitutively active). Other mechanisms of ALK-mediated oncogenesis have also been identified: point mutations in the full-length ALK gene have been reported in particular in neuroblastoma; and overexpression of full-length ALK has also been reported in several tumour types.

ALK inhibitors are widely known for treatment of $ALK^{Pos}$ cancers, that is cancers expressing ALK, in any form. For instance, WO 2009/126154 and WO 2010/002655 disclose triazine and pyrimidine derivatives for use in the treatment of conditions mediated by ALK (in particular cancers mediated by ALK). The first ALK inhibitor approved for cancer treatment was crizotinib, which was approved in 2011 for treatment of $ALK^{Pos}$ NSCLC. A number of other ALK inhibitors have since been approved for the same indication, including ceritinib, alectinib and brigatinib. Ceritinib was first disclosed in WO 2008/073687.

The present invention provides new uses for known ALK inhibitors. The invention includes the provision of ALK inhibitors in the treatment of $ALK^{Neg}LTK^{Pos}$ cancers in humans. Also included is the provision of ALK inhibitors in the treatment of plasma cell-mediated diseases characterised by plasma cells which are $ALK^{Neg}LTK^{Pos}$. Leukocyte tyrosine kinase (LTK) is an endoplasmic reticulum (ER)-resident receptor tyrosine kinase that regulates export from the ER (Centonze et al., Journal of Cell Biology 218(8): 2470-2480, 2019). The present inventor has demonstrated that LTK plays an important role in protein homeostasis (proteostasis).

Proteostasis comprises on the one hand the synthesis and trafficking of nascent proteins, and on the other hand the degradation of misfolded proteins. The biosynthetic and degradative parts of proteostasis are highly interconnected and form the so-called proteostasis network. The ER is a major site for proteostasis and is equipped with various control systems that sense and respond to imbalances of the proteome. When misfolded proteins accumulate, three ER-resident transmembrane proteins (IRE1, ATF6 and PERK) are activated resulting in induction of the unfolded protein response (UPR). The UPR on the one hand increases the capacity of the ER to fold and process proteins, but also stimulates proteasomal degradation of terminally misfolded proteins. The UPR can therefore be referred to as an autoregulatory process of the proteostasis network. While misfolded proteins leave the ER towards the degradative compartments, correctly folded secretory proteins leave the ER in COPII carriers that form at specialized regions called ER exit sites (ERES). While the adaptive responses to misfolded proteins are reasonably well understood, very little is known about equivalent mechanisms that sense the load of folded protein and respond by regulating ERES.

LTK is shown herein to respond to secretory cargo load and adjust the secretory capacity of the ER, thus making it a regulatory node in the proteostasis network. As such, LTK represents a target in the biosynthetic part of the proteostasis network with the potential to be targeted in treatment of diseases that are characterized by excessive protein secretion. Many cancers are characterised by high levels of protein secretion (hypersecretion) and exhibit a heightened dependency on proteostatic mechanisms. Certain plasma cell-mediated diseases, including autoimmune disorders, are also characterised by protein (antibody) hypersecretion by plasma cells, plasmablasts or their precursors.

A particular example of a condition which is characterised by protein hypersecretion is multiple myeloma. Multiple myeloma is a cancer of clonal plasma cells. The affected cells are antibody-producing cells, and multiple myeloma is characterised by antibody hypersecretion. The importance of proteostasis in multiple myeloma is evident through the clinical success of proteasome inhibitors, which inhibit the degradative part of the proteostasis network (Moreau et al., Blood 120(5): 947-959, 2012). Although recent advances in multiple myeloma therapy have resulted in improved survival times, in the years to 2011 the overall 5-year survival rate for multiple myeloma was only 49% (Kazandjian, Seminars in Oncology 43(6): 676-681, 2016), and although therapy may bring about disease remission, it is considered incurable. Accordingly, new treatments are needed.

Another example of a condition which is characterised by cells displaying protein hypersecretion is chronic lymphocytic leukaemia (CLL), a cancer characterised by clonal proliferation of B lymphocytes in lymph nodes, the spleen or the bone marrow. Proliferating CLL blast cells (blasts) in cancer tissue (so-called pseudofollicles) secrete monoclonal antibodies before undergoing cell division (Darwiche et al., Frontiers in Immunology 9:683, 2018).

Other examples of conditions characterised by protein hypersecretion are autoimmune diseases associated with production of autoantibodies by dysregulated plasma cells. One example of such a condition is lupus (also known as systemic lupus erythematosus, or SLE), in which dysregulated B cell differentiation allows development of plasma cells that produce autoantibodies against cell nucleus constituents (such as antinuclear antibodies, ANA). Particularly common targets for autoantibodies in lupus include double-stranded DNA and ribonucleoproteins. Another example of such an autoimmune disease is immune thrombocytopenia (ITP), in which dysregulated plasma cells produce antibodies against platelet surface structures, resulting in platelet depletion leading to blood clotting deficiency. Effective treatments for such autoimmune diseases are needed.

The present inventors have previously shown that certain known ALK inhibitors are effective in inhibition of LTK (Centonze et al., supra). The inventors have now demonstrated that targeting of LTK with clinically-approved ALK-inhibitors sensitises hypersecretory cells, such as multiple myeloma cells and proliferating CLL blasts, to ER stress, and induces apoptosis. In the same manner, a pro-apoptotic effect occurs in dysregulated plasma cells that secrete high levels of autoantibodies in various autoimmune diseases. Accordingly, while ALK inhibitors have previously been considered largely limited in their usefulness to treatment for $ALK^{Pos}$ cancers, the present invention provides new uses for several such drugs, in the treatment of $ALK^{Neg}LTK^{Pos}$ cancers (in particular in the treatment of $ALK^{Neg}LTK^{Pos}$ multiple myeloma and $ALK^{Neg}LTK^{Pos}$ CLL) and plasma cell-mediated diseases characterised by cells which are ALK−/LTK+. The inventors have shown that the effect of ALK inhibitors is independent of ALK expression, as LTK+ ALK-knockdown or ALK-knockout cell lines remain sensitive to ALK inhibition.

Thus in a first aspect the invention provides a linear inhibitor of ALK for use in the treatment of cancer or a plasma cell-mediated disease in a subject, wherein said cancer or plasma cell-mediated disease is characterised by cells which are ALK-negative and LTK-positive.

In a similar aspect, the invention provides a method of treating cancer or a plasma cell-mediated disease in a subject, wherein said cancer or plasma cell-mediated disease is characterised by cells which are ALK-negative and LTK-positive, said method comprising administering to said subject an amount of a linear inhibitor of ALK effective to treat said cancer.

Also provided is a method of diagnosing and treating an ALK-negative cancer in a subject, comprising:
(i) diagnosing cancer in said subject;
(ii) testing said cancer for expression of ALK and LTK; and
(iii) when said cancer is found to be ALK-negative and LTK-positive, administering to said subject a linear inhibitor of ALK in an amount effective to treat said cancer.

Similarly, provided herein is a method of diagnosing and treating an ALK-negative cancer in a subject, comprising:
(i) diagnosing cancer in said subject;
(ii) determining that said cancer is ALK-negative and LTK-positive; and administering to said subject a linear inhibitor of ALK in an amount effective to treat said cancer.

In another aspect, the invention provides the use of a linear inhibitor of ALK in the manufacture of a medicament for treating cancer or a plasma cell-mediated disease in a subject, wherein said cancer or plasma cell-mediated disease is characterised by cells which are ALK-negative and LTK-positive.

In another aspect, the invention provides a linear inhibitor of ALK for use in the treatment of proteasome inhibitor resistant cancer. The proteasome inhibitor resistant cancer is preferably proteasome inhibitor resistant multiple myeloma. The proteasome inhibitor resistant cancer may be an LTK-positive cancer, in particular LTK-positive multiple myeloma.

As will be discussed in more detail below, the subject may be any mammalian subject, but in certain preferred embodiments of the above aspects it is a human subject.

As mentioned above, the present inventor has discovered that several known ALK inhibitors (also referred to herein as inhibitors of ALK) are also effective in inhibition of LTK. In particular, as shown in the Examples, it has been found that linear ALK inhibitors are effective in inhibition of LTK. However, cyclic ALK inhibitors have been found to be ineffective. While ALK and LTK are related proteins (their cytoplasmic kinase domains are 79% identical in humans; Centonze et al., supra), it could not have been predicted that certain ALK inhibitors would show cross-specificity against LTK, while others would not.

An ALK inhibitor, as referred to herein, is a compound which is capable of interacting with ALK (specifically human ALK) and reducing or abrogating its activity. Human ALK has the UniProt accession number Q9UM73. An ALK inhibitor is capable of inhibiting the activity of both full-length, wild-type ALK and ALK fusion proteins. A number of methods for testing compounds for activity in ALK inhibition are known, as described in Chand et al. (Disease Models & Mechanisms 6: 373-382, 2013, incorporated herein by reference). For instance, ALK activation requires autophosphorylation on Tyr1278. Inhibition of ALK activity thus inhibits Tyr1278 autophosphorylation, which may be detected by immunoblot using an anti-phospho-ALK (Y1278) antibody. Such antibodies are commercially available (e.g. antibody #3710, Cell Signaling Technology, USA). Accordingly, to determine whether a compound has activity in ALK inhibition (i.e. is an ALK inhibitor), the compound of interest may be applied to cells expressing human ALK, the cells lysed and ALK autophosphorylation on Tyr1278 analysed.

Other methods of testing for ALK inhibition are also known, e.g. analysis of ALK autophosphorylation on Tyr1604 and/or phosphorylation of ALK substrates, such as ERK and STAT3, as described in Chand et al. (supra).

Several ALK inhibitors are known in the art, and to date six have been approved for medical use: crizotinib, ceritinib, alectinib, brigatinib, entrectinib and lorlatinib. Other known ALK inhibitors include belizatinib.

The ALK inhibitor for use herein is also effective in inhibition of LTK, specifically human LTK. Human LTK has the UniProt accession number P29376. By "effective in inhibition of LTK" is meant that the inhibitor is capable of interacting with LTK (specifically human LTK) and reducing or abrogating its activity. Methods for testing compounds for activity in LTK inhibition are known, and are demonstrated in the Examples below. In particular, LTK activation requires autophosphorylation on Tyr672, which is equivalent to autophosphorylation of ALK on Tyr1278. Many antibodies which recognise phospho-ALK(Y1278) also recognise phospho-LTK(Y672). Suitable antibodies for detecting phospho-LTK(Y672) are commercially available (e.g. antibody D59G10, Cell Signaling Technology). Accordingly, to determine whether a compound has activity in LTK inhibition (i.e. is an inhibitor of LTK), the compound of interest may be applied to cells expressing human LTK, the cells lysed and LTK autophosphorylation on Tyr672 analysed.

As noted above, the present inventor has discovered that linear ALK inhibitors also have activity in LTK inhibition, whereas cyclic ALK inhibitors are ineffective against LTK. By "linear" ALK inhibitor is meant an ALK inhibitor which lacks a central ring which acts as a molecular core (i.e. a central ring from which all functional groups extend). Such a ring is referred to herein as a cyclic molecular core. Thus a linear ALK inhibitor may nonetheless include cyclic functional groups, such as phenyl groups and suchlike. However in this instance, not all functional groups and side chains extend from (or form part of) the same cyclic structure. In other words, the term "linear ALK inhibitor" does not include molecules which are cyclized, in the sense of having a "circular" structure (i.e. a circular skeleton) which does not include distinct and defined ends. An ALK inhibitor which comprises a cyclic molecular core is a cyclic ALK-inhibitor, or, alternatively expressed, a cyclized, or circular, ALK-inhibitor.

An example of a cyclic ALK inhibitor is lorlatinib, which has the structure set forth in Formula I. As shown, lorlatinib comprises a 12-membered ring, which forms the core of the molecule. Having this core ring, lorlatinib is a cyclic ALK inhibitor. Lorlatinib has been found not to have activity in inhibition of LTK.

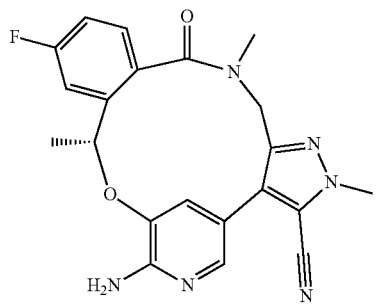

Formula I

Lorlatinib

Linear ALK inhibitors have structures that lack a cyclic molecular core. Rather, linear ALK inhibitors comprise a number of functional groups joined to each other in series. Examples of linear ALK inhibitors include crizotinib, ceritinib, brigatinib, ensartinib, alectinib and entrectinib. The structure of crizotinib (3-[(1R)-1-(2,6-dichloro-3-fluorophenyl)ethoxy]-5-(1-piperidin-4-ylpyrazol-4-yl)pyridin-2-amine) is set forth in Formula II; the structure of ceritinib (5-chloro-2-N-(5-methyl-4-piperidin-4-yl-2-propan-2-yloxyphenyl)-4-N-(2-propan-2-ylsulfonylphenyl)pyrimidine-2,4-diamine) is set forth in Formula III; the structure of brigatinib (5-chloro-4-N-(2-dimethylphosphorylphenyl)-2-N-[2-methoxy-4-[4-(4-methylpiperazin-1-yl)piperidin-1-yl]phenyl]pyrimidine-2,4-diamine) is set forth in Formula IV; the structure of ensartinib (6-amino-5-[(1R)-1-(2,6-dichloro-3-fluorophenyl)ethoxy]-N-[4-[(3R,5S)-3,5-dimethylpiperazine-1-carbonyl]phenyl]pyridazine-3-carboxamide) is set forth in Formula V; the structure of alectinib (9-ethyl-6,6-dimethyl-8-(4-morpholin-4-ylpiperidin-1-yl)-11-oxo-5H-benzo[b]carbazole-3-carbonitrile) is set forth in Formula VI; and the structure of entrectinib (N-[5-[(3,5-difluorophenyl)methyl]-1H-indazol-3-yl]-4-(4-methylpiperazin-1-yl)-2-(oxan-4-ylamino)benzamide) is set forth in Formula VII.

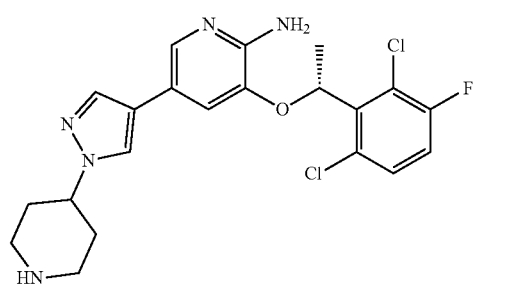

Formula II

Crizotinib

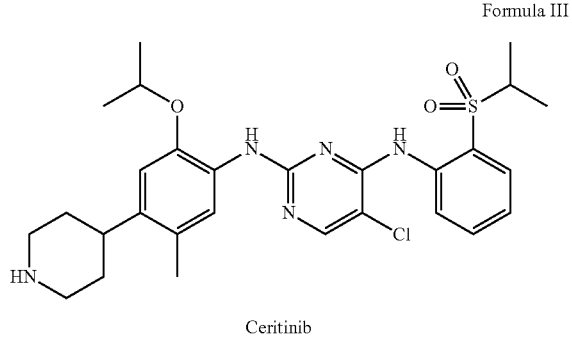

Formula III

Ceritinib

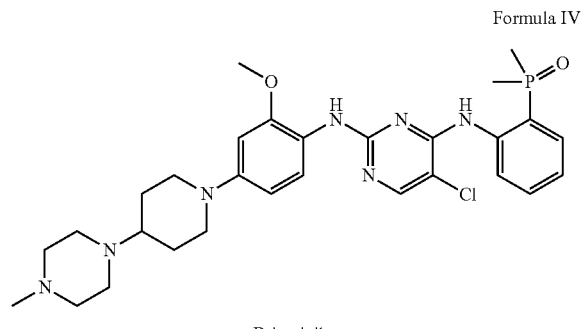

Formula IV

Brigatinib

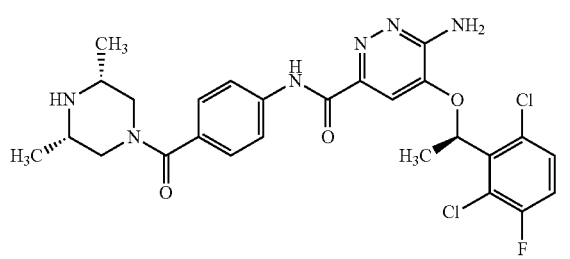

Formula V

Ensartinib

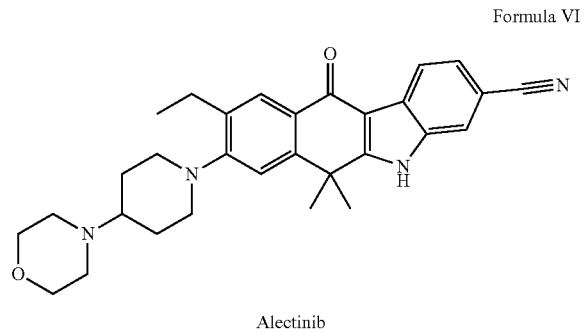

Formula VI

Alectinib

-continued

Formula VII

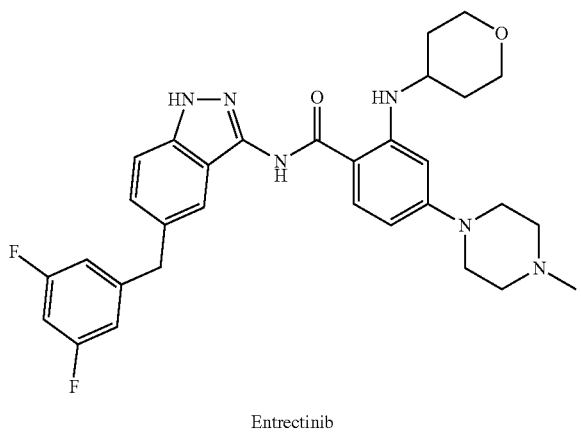

Entrectinib

As can be seen in Formulae II-VII, the linear ALK inhibitors lack a cyclic molecular core. Although the linear ALK inhibitors exemplified all contain cyclic groups (e.g. phenyl groups), none of these form a central ring from which all functional groups extend.

In a non-linear, "cyclic", ALK inhibitor, a cyclic molecular core may be the largest cyclic group within an ALK inhibitor. Particularly, a cyclic molecular core may comprise at least two members more than any other cyclic group within the molecule. Alternatively defined, a cyclic molecular core may be at least an 8-membered ring, e.g. a 9-membered ring, a 10-membered ring, an 11-membered ring or a 12-membered ring. The cyclic molecular core of lorlatinib is a 12-membered ring. As mentioned above, a linear ALK inhibitor is an ALK inhibitor which does not have a cyclic molecular core.

The ALK inhibitor according to the present invention is for use in the treatment of cancer or a plasma cell-mediated disease, characterised by cells which are $ALK^{Neg}$ and $LTK^{Pos}$. A cancer characterised by cells which are $ALK^{Neg}$ and $LTK^{Pos}$ is a cancer of which the constituent, malignant cells express LTK but do not express ALK. That is to say, the cancer to be treated according to the present invention is $ALK^{Neg}$ (ALK-negative) and $LTK^{Pos}$ (LTK-positive).

By $ALK^{Pos}$ (or ALK-positive) cancer, as used herein, is meant a cancer which expresses the ALK protein in any form: as the wild-type protein, as an ALK fusion protein, or as a mutated full-length protein (e.g. containing a gain-of-function mutation). Methods to determine whether a cancer expresses ALK are standard in the art, and are currently used routinely to determine ALK expression status for cancers for which ALK inhibitor treatment has been approved, in particular NSCLC.

Such methods are typically performed on cancer biopsy samples. An example of a suitable method for detecting ALK expression is immunohistochemistry (IHC). IHC kits for detection of ALK expression have received regulatory approval and are commercially available. An example of such a kit is the Ventana ALK (D5F3) CDx Assay (Roche, Switzerland), which may be used to detect ALK expression. Other such kits may also be used.

In a particular embodiment, a cancer which gives a positive result in an ALK expression test which has received regulatory approval is considered ALK-positive, and any cancer which gives a negative result in such an ALK expression test is considered ALK-negative. The skilled pathologist is capable of routinely determining whether a tissue sample is $ALK^{Pos}$ or $ALK^{Neg}$.

Thus an $ALK^{Neg}$ cancer may be a cancer which is determined to be ALK-negative when cancer tissue is analysed for ALK expression. In particular, an $ALK^{Neg}$ cancer may be a cancer in which ALK expression is not detected by IHC. For instance, an ALK-negative cancer may be a cancer which provides a negative result according to an assay which has received regulatory approval for ALK expression detection. In a particular embodiment an $ALK^{Neg}$ cancer is a cancer which provides a negative result according to the Ventana ALK (D5F3) CDx Assay.

ALK gene rearrangements may also be directly detected at the genomic level, using e.g. fluorescent in situ hybridisation (FISH). Break-apart FISH may in particular be used to detect ALK gene rearrangements, and suitable break-apart FISH kits are commercially available (e.g. the Vysis ALK Break Apart FISH Probe Kit, Abbott Molecular, USA; product number 06N38-023) and can be designed by the skilled person. A cancer displaying an ALK gene rearrangement at the DNA level is defined herein as an $ALK^{Pos}$ cancer. As noted above, the current invention is directed to treatment of ALK-cancers.

Similarly, $LTK^{Pos}$ cancer is a cancer that has a detectable level of LTK expression. Standard methods in the art can be used to detect LTK expression, as for ALK detection. Such methods may typically be performed on biopsy samples. For instance, immunohistochemistry (e.g. immunofluorescent staining) may be utilised to directly detect LTK protein expression. Reverse transcriptase PCR (RT-PCR) may reliably be used to detect LTK expression at the mRNA level. Suitable primers for use in LTK RT-PCR can be designed by the skilled person. Preferably qPCR is used to detect LTK expression. Suitable primers for use in LTK qPCR can be designed by the skilled person, and are also commercially available (e.g. LTK QuantiTect primer assay, Qiagen; catalogue number QT00219877).

Thus, according to the present invention, cancer may be diagnosed in a subject using methods standard in the art. The cancer may then be tested for expression of ALK and LTK. A biopsy sample may be obtained for ALK and LTK expression testing. Where a biopsy sample was used in diagnosis of the cancer, the same biopsy sample or a different biopsy sample may be used in ALK and LTK expression testing. The biopsy sample may be obtained by any means appropriate for the cancer type. For instance, the biopsy sample may be obtained by surgical biopsy, e.g. it may be an excisional biopsy sample. Alternatively, the sample may be obtained by needle biopsy. In the case of haematological cancers, including multiple myeloma and CLL, the biopsy sample may be obtained by bone marrow biopsy (Myeloma and CLL) or blood sample (CLL). The skilled physician is competent to obtain an appropriate biopsy sample.

The biopsy sample may be a liquid biopsy sample, obtained from e.g. blood. In particular, circulating tumour cells may be isolated and analysed for ALK and LTK expression, as described above. A liquid biopsy method for multiple myeloma diagnosis and characterisation was disclosed in Kamande et al. (Integrative Biology 10(2): 82-91, 2018), which may be used to test for ALK and LTK expression, as described above. If the tested cancer is found to be $ALK^{Neg}LTK^{Pos}$, it may be treated with an ALK inhibitor according to the present invention.

Thus, whether a cancer is $ALK^{Neg}$ and $LTK^{Pos}$ may be determined experimentally, using the techniques described above. Alternatively, in some instances it may be assumed that a cancer is $ALK^{Neg}$ and $LTK^{Pos}$ based on the known characteristics of the relevant cancer. Thus the determination may be made without laboratory confirmation, where the circumstances allow.

The term "cancer" as used herein is used in accordance with its normal meaning in the art, i.e. a malignant neoplastic condition. The cancer treated according to the present invention may be any kind of cancer, including both solid cancers and haematological cancers. Any cancer that is $ALK^{Neg}$ and $LTK^{Pos}$ may be treated in accordance with the present invention.

In an embodiment, the cancer to be treated in accordance with the present invention is ROS1-negative ($ROS1^{Neg}$). ROS1 is a tyrosine kinase related to ALK. Its role in normal development is uncertain, but it has been found to be aberrantly expressed in several cancers. Many ALK inhibitors display activity in the inhibition of ROS1, and such ALK inhibitors (e.g. crizotinib) have been found to be useful in the treatment of $ROS1^{Pos}$ cancer. Human ROS1 has the UniProt accession number P08922. In the context of cancer, ROS1 has been found to be expressed within fusion proteins, generated as a result of gene rearrangements. Several oncogenic ROS1 fusion proteins are known, in which ROS1 is constitutively active, including fusions with FIG, CD74, TPM3, SDC4 and SLC34A2, amongst others.

A ROS1-negative cancer may display no detectable expression of ROS1. However, ROS1 expression is found in some healthy adult human tissues. Accordingly, a $ROS1^{Neg}$ cancer may more preferably be defined as a cancer which is not caused by ROS1 expression. In particular a $ROS1^{Neg}$ cancer may be defined as a cancer which does not express a mutant ROS1 generated by a gene rearrangement event. In particular, a $ROS1^{Neg}$ cancer does not express a ROS1 fusion protein. This is consistent with the terminology used in the art, in which the term "ROS1-positive" ($ROS1^{Pos}$) is commonly used to refer to cancer which expresses a ROS1 fusion protein.

The involvement of ROS1 in cancer, and in particular the role of ROS1 fusion proteins, and how such proteins may be detected, is described in Davies & Doebele, Clinical Cancer Research 19(15): 4040-4045, 2013. Expression of ROS1 fusion proteins may be detected using any means known in the art, e.g. qPCR or immunohistochemistry. Alternatively, ROS1 gene rearrangement may be detected directly at the DNA level, e.g. by FISH (a "break-apart" FISH assay for detection of ROS1 gene rearrangement is described in Davies et al., Clinical Cancer Research 18(17): 4570-4579, 2012, incorporated herein by reference) or next generation genome sequencing. Thus the cancer to be treated according to the invention may be $ALK^{Neg}$ and $ROS1^{Neg}$ and $LTK^{Pos}$.

In another embodiment, the cancer to be treated in accordance with the present invention is NTRK fusion-negative (referred to herein as NTRK-f-negative, $NTRK-f^{Neg}$). Three NTRK genes exist in humans: NTRK1, NTRK2 and NTRK3 (which respectively encode TrkA, TrkB and TrkC). TrkA has the UniProt accession number P04629; TrkB has the UniProt accession number Q16620; TrkC has the UniProt accession number Q16288. The Trk proteins are receptor tyrosine kinases also related to ALK. Similarly to ALK and ROS1, Trk gene rearrangements have been found to be associated with cancer, particularly rearrangements which yield constitutively active Trk fusion proteins. Several such oncogenic Trk fusion proteins are known, including fusions of a Trk protein with TPM3, CD74, TRIM24 and ETV6, amongst others.

An $NTRK-f^{Neg}$ cancer is a cancer which does not express a mutant Trk protein generated by a gene rearrangement event, in particular a Trk fusion protein. Methods for detection of NTRK gene fusions are known in the art, and are reviewed in Hsiao et al., Journal of Molecular Diagnostics 21(4): 553-571. Suitable methods include immunohistochemistry (utilising a pan-Trk antibody capable of binding TrkA, TrkB and TrkC fusion proteins; FISH (particularly break-apart FISH); qPCR; and next generation DNA sequencing. Thus the cancer to be treated according to the invention may be $ALK^{Neg}$ and $NTRK-f^{Neg}$ and $LTK^{Pos}$. In a particular embodiment, the cancer according to the invention is $ALK^{Neg}$ and $Ros1^{Neg}$ and $NTRK-f^{Neg}$ and $LTK^{Pos}$ ($ALK^{Neg}ROS1^{Neg}NTRK-f^{Neg}LTK^{Pos}$).

The cancer to be treated in accordance with the present invention may be a cancer associated with protein hypersecretion. A cancer associated with protein hypersecretion is a cancer that has high metabolic activity and secretes significantly more protein than other cells. An example of a cancer associated with protein hypersecretion is multiple myeloma, which is associated with hypersecretion of monoclonal immunoglobulin known as M protein. Multiple myeloma cells are cancerous plasma cells that demonstrate protein hypersecretion. As further detailed below, CLL cells also express LTK, are ALK-negative and are targeted by ALK inhibitors in the proliferative state. Herein, CLL cells are cancerous blast cells that demonstrate protein hypersecretion. As further detailed below, non-cancerous plasma cells also express LTK, are ALK-negative and are targeted by ALK inhibitors.

In a particular embodiment the cancer treated according to the invention is multiple myeloma. Multiple myeloma (also known simply as "myeloma") is a cancer of clonal plasma cells, as discussed above. Multiple myeloma may be diagnosed based on the presence of M protein in the blood and/or urine. More commonly, multiple myeloma is diagnosed by bone marrow biopsy, performed to determine the percentage of bone marrow occupied by plasma cells. Medical imaging (e.g. X-rays, MRI scans and PET/CT scans) may be performed to identify lytic lesions in the skeleton, which are characteristic of multiple myeloma. Multiple myeloma may thus be identified using standard methods in the art. $ALK^{Neg}LTK^{Pos}$ multiple myeloma may be treated with an ALK inhibitor according to the invention.

The examples below demonstrate that ALK inhibitors are effective in reducing the viability of $ALK^{Neg}LTK^{Pos}$ multiple myeloma. As shown in the examples below, a significant proportion of multiple myelomas are $ALK^{Neg}$ (>99.8% of multiple myelomas from 767 patients). The present invention thus advantageously provides a new treatment option for a significant $LTK^{Pos}$ sub-set of multiple myeloma patients (estimated to be over 80% of multiple myeloma patients, based on the analysis of 767 patients described below).

In another embodiment the cancer treated according to the invention is the B-cell malignancy chronic lymphocytic leukaemia (CLL). Of 107 CLL patients analysed by the inventors, 94/107 (88%) had CLL cells that expressed LTK, and none had CLL cells that expressed ALK. Thus the majority of tested CLL patients had $ALK^{Neg}LTK^{Pos}$ cancers. CLL cells divide in lymphatic tissue or in the bone marrow in pseudofollicles where cancer-supportive cells activate CLL cell division. Malignant CLL cells become activated large cancer cells called blasts in the proliferative state. In this state, CLL cells also become hypersecretory and secrete monoclonal Ig (M protein). CLL patients may have one of two forms of the cancer: IgVH-mutated and IgVH-unmutated CLL. Both IgVH-unmutated and IgVH-mutated types of CLL are susceptible to killing by ALK-inhibitors, and thus both IgVH-mutated and IgVH-unmutated CLL may be treated according to the invention. CLL cancer cells from both prior-treated and untreated patients are susceptible to killing by ALK-inhibitors. Thus an ALK inhibitor may be used according to the invention as a first-line treatment for CLL (e.g. for newly-diagnosed CLL or newly-symptomatic CLL), or to treat relapsed CLL.

In another embodiment the cancer treated according to the invention is an ALK$^{Neg}$LTK$^{Pos}$ hepatic cancer. By hepatic cancer is meant a primary hepatic cancer, and not a secondary hepatic cancer spread to the liver from elsewhere in the body. All types of liver cancer may be treated according to the current invention, including hepatocellular carcinoma, cholangiocarcinoma and other rare types of hepatic cancers.

LTK and ALK are expressed in all mammals. The invention accordingly extends to the treatment of any mammalian subjects. Thus, in addition to human subjects, the subject may be any livestock, domestic or sporting animal. The invention includes treatment of an ALK$^{Neg}$LTK$^{Pos}$ cancer in a human or non-human mammal. Examples of non-human mammals which may be treated according to the invention include canines (Canidae), felines (Felidae), and equines (Equidae).

The cancer treated according to the present invention may be at any stage, e.g. a stage I, stage II, stage III or stage IV cancer. Thus the cancer treated according to the present invention may be localised, or may have metastasised. In the context of multiple myeloma, the myeloma may be at stage 1, stage 2 or stage 3, as classified according to the International Staging System. The cancer treated according to the present invention may be a recurrence of a cancer, e.g. the invention may be used in the treatment of relapsed or recurrent multiple myeloma or CLL. Treatment of multiple myeloma according to the invention includes treatment of smouldering myeloma. Smouldering myeloma is precursor to active multiple myeloma. Treatment of smouldering myeloma may prevent or delay its progression to active multiple myeloma.

The cancer treated according to the present invention is in a human subject (or patient). The patient treated according to the present invention is a patient who has been diagnosed with an ALK$^{Neg}$LTK$^{Pos}$ cancer. Such diagnosis can be performed as described above. In a particular embodiment the patient treated according to the present invention is a patient who has been diagnosed with ALK$^{Neg}$LTK$^{Pos}$ multiple myeloma. Alternatively, the patient may have been diagnosed with ALK$^{Neg}$LTK$^{Pos}$ CLL. Alternatively the patient may have been diagnosed with ALK$^{Neg}$LTK$^{Pos}$ primary hepatic cancer. The patient may be of any age, and may be male or female.

As described above, cancers associated with protein hypersecretion (in particular multiple myeloma) are commonly treated with proteasome inhibitors. To date, three proteasome inhibitors have been approved for treatment of multiple myeloma: bortezomib (Formula VIII); carfilzomib (Formula IX) and ixazomib (Formula X).

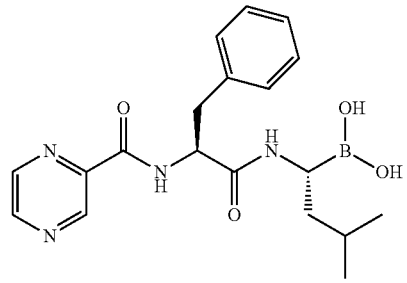

Bortezomib

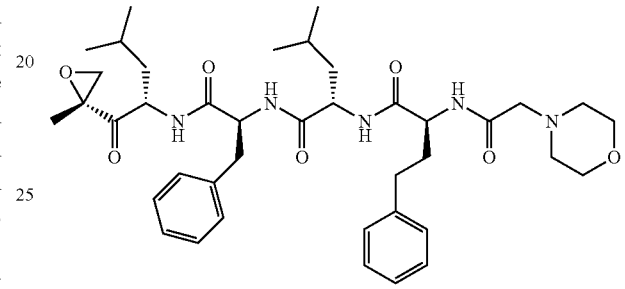

Carfilzomib

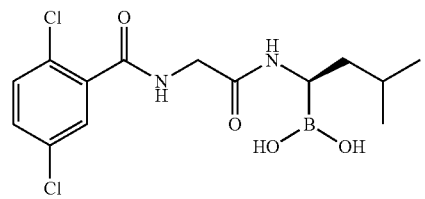

Ixazomib

A number of other proteasome inhibitors are also known in the art, some of which are undergoing clinical trials for cancer therapy, including: marizomib, oprozomib and MG132.

In an embodiment, the cancer treated according to the present invention is resistant to treatment with a proteasome inhibitor. A cancer which is resistant to treatment with a proteasome inhibitor is a cancer whose growth is not inhibited by a proteasome inhibitor. That is to say, a cancer which is resistant to treatment with a proteasome inhibitor is a cancer that does not respond to treatment with a proteasome inhibitor, i.e. a cancer which continues to grow, or progress, despite treatment with a proteasome inhibitor.

A cancer which is resistant to treatment with a proteasome inhibitor may be inherently resistant to treatment with a proteasome inhibitor. As noted above, cancers characterised by protein hypersecretion are particularly susceptible to proteasome inhibitor therapy. This is because the increased level of protein synthesis in cancers characterised by protein hypersecretion results in increased levels of misfolded proteins in the endoplasmic reticulum (ER), causing ER stress. This is relieved by degradation of the misfolded proteins by the proteasome. Proteasome inhibition prevents degradation of misfolded proteins, and thus prevents relief of ER stress, leading to cell death. Cancers which are not associated with protein hypersecretion, on the other hand, may not be affected by proteasome inhibition, and thus may be resistant to treatment with a proteasome inhibitor.

Other cancers may be inherently resistant to proteasome inhibitor treatment due to mutations in the proteasome at sites bound by inhibitors. For instance, an A49T mutation in the β5 subunit of the human proteasome has been found to be associated with bortezomib resistance. Mechanisms by which cancers can resist treatment with proteasome inhibitors are reviewed in Wallington-Beddoe et al., British Journal of Haematology 182(1): 11-28, 2018.

A cancer which is inherently resistant to treatment with a proteasome inhibitor is a cancer which never responds to proteasome inhibitor treatment, i.e. the first time the proteasome inhibitor is administered to the patient, the cancer does not respond to the treatment but rather continues to grow and/or progress.

Alternatively, the cancer resistant to treatment with a proteasome inhibitor may have acquired proteasome inhibitor resistance. A cancer which has acquired proteasome inhibitor resistance is a cancer which was initially responsive to treatment with a proteasome inhibitor, but subsequently loses its responsiveness to this treatment. Such a loss of responsiveness to proteasome inhibitor therapy may cause relapse or recurrence of the cancer in the patient being treated. A cancer may acquire resistance to a proteasome inhibitor by any one or more of the mechanisms discussed above and reviewed in Wallington-Beddoe et al. (supra), including particularly the development of mutations in the proteasome, preventing inhibitor binding.

The cancer which is resistant to treatment with a proteasome inhibitor may be resistant to treatment with one or more proteasome inhibitors. It is known that different proteasome inhibitors have different binding properties in respect of the proteasome, and that therefore cancers may be resistant to one proteasome inhibitor but susceptible to treatment with another. In a particular embodiment the cancer is resistant to treatment with bortezomib. In another embodiment the cancer is resistant to treatment with carfilzomib. In another embodiment the cancer is resistant to treatment with ixazomib. The cancer may be resistant to treatment with all proteasome inhibitors, particularly all proteasome inhibitors licensed for cancer treatment. The cancer resistant to treatment with a proteasome inhibitor may be multiple myeloma, and in particular multiple myeloma which is resistant to bortezomib treatment.

By a "plasma cell-mediated disease" is meant a disease or condition in which dysregulated plasma cells, or antibodies produced by plasma cells, impair health. That is to say, any disease or condition which is caused by, or contributed to by, the activity of plasma cells, is a plasma cell-mediated disease. In plasma cell-mediated diseases, antibodies produced by plasma cells cause tissue damage in the patient. Such diseases are frequently associated with antibody hypersecretion from the dysregulated plasma cells. The present invention provides a linear inhibitor of ALK for use in treatment of a plasma cell-mediated disease characterised by cells which are ALK-negative and LTK-positive. In this context, the cells which are $ALK^{Neg}$ and $LTK^{Pos}$ are the plasma cells which mediate the disease.

Examples of plasma cell-mediated diseases include many autoimmune diseases, including systemic lupus erythematosus and ITP, and graft-versus-host disease (GVHD). While GVHD is sometimes primarily considered a T-cell mediated disease, it also has an important B-cell component in chronic rejection. Here, dysregulated plasma cells produce autoantibodies, which significantly contributes to delayed graft rejection and disease impact. Accordingly GVHD is considered herein a plasma cell-mediated disease.

By "plasma cell" as defined herein is meant all types of cell of the plasma cell lineage, i.e. mature plasma cells and their precursors. Plasma cells are herein defined as late to end differentiated B-cells that comprise antibody-secreting plasmablasts and other antibody-secreting B-cell blasts. Thus "plasma cell" includes mature plasma cells, and short-lived plasmablasts. As known to the skilled person, activated memory B cell blasts may express CD20, CD20 may be lost in plasmablasts that are $CD38^{Hi}CD138^{Neg}$. Plasma cells may be $CD38^{Hi}CD138^{Pos}CD19^{+}$ or $CD38^{Hi}CD138^{Pos}CD19^{Neg}$ end differentiated plasma cells.

Thus according to the invention, a linear ALK inhibitor may be used to treat an autoimmune disease, in particular an autoimmune disease which is characterised by production of autoantibodies. Examples of autoimmune diseases treatable according to the invention include lupus and ITP. The invention also provides treatment of GVHD using a linear ALK inhibitor. As noted above, non-cancerous plasma cells (e.g. plasmablasts and mature plasma cells) are characterised as having an $ALK^{Neg}LTK^{Pos}$ phenotype, and thus any plasma cell-mediated disease treated according to the present invention (such as an autoimmune disease or GVHD) is mediated by plasma cells which are $ALK^{Neg}LTK^{Pos}$, though the ALK and LTK phenotypes of the plasma cells may be determined experimentally, as described above.

Since as noted above, LTK and ALK are expressed in all mammals, the invention provides a linear ALK inhibitor to treat an autoimmune disease, in particular an autoimmune disease which is characterised by production of autoantibodies by $ALK^{Neg}LTK^{Pos}$ plasma cells, in any mammalian subject, including human and non-human mammals. Non-human mammals which may be treated according to the invention include canines (Canidae), felines (Felidae), and equines (Equidae).

As noted above, linear ALK inhibitors have been found to inhibit LTK. An ALK inhibitor used for treatment of cancer or a plasma cell-mediated disease according to the present invention may accordingly be any known ALK inhibitor, so long as the inhibitor also has activity against LTK. Thus, in the various aspects of the invention set out and described herein, the ALK inhibitor may alternatively be defined as an ALK inhibitor capable of inhibiting LTK, or more particularly capable of inhibiting the activity of LTK.

In an embodiment, the ALK inhibitor has the general structure set forth in Formula XI, below.

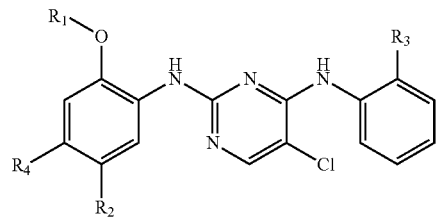

Formula XI

In the ALK inhibitor of Formula X, $R_1$ is $CH_3$ or iPr; $R_2$ is H or $CH_3$;

$R_3$ is

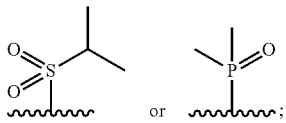

and $R_4$ is

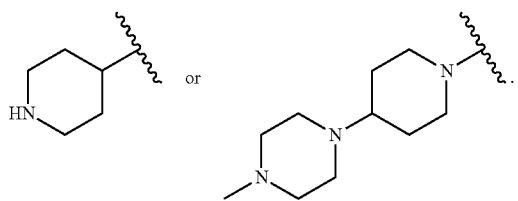 [SMILES: *C1CCNCC1 ; *N1CCC(N2CCN(C)CC2)CC1]

The ALK inhibitor used according to the present invention may in particular be ceritinib (Formula III). Ceritinib has the trade name Zykadia, and is also commercially available (e.g. as item no. 19374 from Cayman Chemical, USA).

The standard dosing regime for ceritinib in treatment of NSCLC is a once daily 450 mg oral dose. In a particular embodiment of the present invention, treatment with ceritinib comprises administration of a once daily dose of about 450 mg ceritinib, preferably a once daily dose of 450 mg ceritinib. In other embodiments, the treatment comprises administration of a once daily dose of about 300 mg ceritinib or about 150 mg ceritinib, preferably a once daily dose of 300 mg ceritinib or 150 mg ceritinib. In a particular embodiment, the treatment comprises administration of a once daily dose of 100-400 mg ceritinib, e.g. 200-400 mg, 100-300 mg, 200-300 mg or 300-400 mg ceritinib. In another embodiment, the treatment comprises administration of a once daily dose of 400-600 mg ceritinib, e.g. 400-500 mg or 500-600 mg ceritinib. In a particular embodiment the invention provides a treatment for $ALK^{Neg}LTK^{Pos}$ multiple myeloma comprising administration of a once daily dose of 400-500 mg ceritinib, preferably 450 mg ceritinib. Ceritinib is preferably administered orally.

In a particular embodiment, the invention provides ceritinib for use in the treatment of ALK-negative and LTK-positive multiple myeloma in a human subject, wherein said treatment comprises daily administration of a dose comprising 450 mg ceritinib, and said dose is administered orally.

In another embodiment, the invention provides ceritinib for use in the treatment of ALK-negative and LTK-positive multiple myeloma in a human subject, wherein said treatment comprises daily administration of a dose comprising 300 mg ceritinib, and said dose is administered orally.

In another embodiment, the invention provides ceritinib for use in the treatment of ALK-negative and LTK-positive multiple myeloma in a human subject, wherein said treatment comprises daily administration of a dose comprising 150 mg ceritinib, and said dose is administered orally.

In another embodiment, the invention provides ceritinib for use in the treatment of ALK-negative and LTK-positive multiple myeloma in a human subject, wherein said treatment comprises daily administration of a dose comprising 500-600 mg ceritinib, and said dose is administered orally.

In another embodiment, the invention provides ceritinib for use in the treatment of ALK-negative and LTK-positive multiple myeloma in a human subject, wherein said treatment comprises daily administration of a dose comprising 400-500 mg ceritinib, and said dose is administered orally.

In another embodiment, the invention provides ceritinib for use in the treatment of ALK-negative and LTK-positive multiple myeloma in a human subject, wherein said treatment comprises daily administration of a dose comprising 300-400 mg ceritinib, and said dose is administered orally.

In another embodiment, the invention provides ceritinib for use in the treatment of ALK-negative and LTK-positive multiple myeloma in a human subject, wherein said treatment comprises daily administration of a dose comprising 200-300 mg ceritinib, and said dose is administered orally.

In another embodiment, the invention provides ceritinib for use in the treatment of ALK-negative and LTK-positive multiple myeloma in a human subject, wherein said treatment comprises daily administration of a dose comprising 100-200 mg ceritinib, and said dose is administered orally.

In another embodiment, there is provided ceritinib for use in the treatment of LTK-positive multiple myeloma in a human subject, wherein said treatment comprises daily administration of a dose comprising 300-750 mg ceritinib, and said dose is administered orally.

In another embodiment, there is provided brigatinib for use in the treatment of LTK-positive multiple myeloma in a human subject, wherein said treatment comprises daily administration of a dose comprising 50-200 mg brigatinib, and said dose is administered orally.

In another embodiment, there is provided a method of treating cancer in a patient diagnosed with multiple myeloma, chronic lymphocytic leukaemia or hepatic cancer, comprising the steps:
  obtaining a sample comprising cancer cells from said patient;
  performing an LTK expression assay on said cancer cells;
  and administering an effective amount of a linear ALK-inhibitor to the patient if the cancer cells express LTK.

In another embodiment, there is provided a method of treating cancer in a patient diagnosed with multiple myeloma, chronic lymphocytic leukaemia or hepatic cancer, comprising the steps:
  obtaining a sample comprising cancer cells from said patient;
  performing an LTK expression assay on said cancer cells;
  and administering an effective amount of an ALK-inhibitor selected from ceritinib, brigatinib, crizotinib, ensartinib and entrectinib to the patient, if the cancer cells express LTK.

In another embodiment, there is provided a method of treating an autoimmune disease in a patient diagnosed with lupus or immune thrombocytopenia, comprising the steps:
  obtaining a sample comprising plasma cells from said patient;
  performing an LTK expression assay on said plasma cells;
  and administering an effective amount of a linear ALK-inhibitor to the patient if the plasma cells express LTK.

In another embodiment, there is provided a method of treating an autoimmune disease in a patient diagnosed with lupus or immune thrombocytopenia, comprising the steps:
  obtaining a sample comprising plasma cells from said patient;
  performing an LTK expression assay on said plasma cells;
  and administering an effective amount of an ALK-inhibitor selected from ceritinib, brigatinib, crizotinib, ensartinib and entrectinib to the patient if the plasma cells express LTK.

In another embodiment, there is provided a method of treating graft-versus-host disease in a patient, comprising the steps:
obtaining a sample comprising plasma cells from said patient;
performing an LTK expression assay on said plasma cells;
and administering an effective amount of a linear ALK-inhibitor to the patient if the plasma cells express LTK.

In another embodiment, there is provided a method of treating graft-versus-host disease in a patient, comprising the steps:
obtaining a sample comprising plasma cells from said patient;
performing an LTK expression assay on said plasma cells;
and administering an effective amount of an ALK-inhibitor selected from ceritinib, brigatinib, crizotinib, ensartinib and entrectinib to the patient if the plasma cells express LTK.

Ceritinib may be administered in any suitable form. Various crystalline forms of ceritinib are known, and detailed in WO 2012/082972 and WO 2016/098070. Any such crystalline form may be used, according to the present invention. Preferably ceritinib is administered formulated in a capsule.

In another embodiment the ALK inhibitor used according to the present invention is brigatinib (Formula IV). Brigatinib has the trade name Alunbrig, and as a standard is administered to patients orally following a regime of 90 mg once daily for 7 days, followed by 180 mg once daily. In an embodiment of the invention, brigatinib is administered according to this regime. In another embodiment, brigatinib is administered orally following a regime of 60 mg once daily for 7 days, followed by 120 mg once daily or 90 mg once daily. In another embodiment, brigatinib is administered as a once daily 60 mg oral dose. Brigatinib is preferably administered formulated in a tablet.

In another embodiment, the ALK inhibitor used according to the present invention is crizotinib (Formula II). Crizotinib (trade name Xalkori) is administered to patients as a standard following a regime of 250 mg twice daily, taken orally. In an embodiment of the invention, crizotinib is administered according to this regime. In another embodiment, 200 mg crizotinib is administered orally, twice daily. In another embodiment, crizotinib is administered once daily as a 250 mg oral dose. Crizotinib is preferably administered formulated in a capsule.

In another embodiment, the ALK inhibitor used according to the present invention is ensartinib (Formula V). Ensartinib may be administered orally as a once daily 225 mg dose.

In another embodiment, the ALK inhibitor used according to the present invention is alectinib (Formula VI). Alectinib (trade name Alecensa) is administered to patients as a standard following a regime of 600 mg twice daily, taken orally. In an embodiment of the invention, alectinib is administered according to this regime. In another embodiment, 450 mg alectinib is administered orally, twice daily. In another embodiment, 300 mg alectinib is administered orally, twice daily. Alectinib is preferably administered formulated in a capsule.

In another embodiment, the ALK inhibitor used according to the present invention is entrectinib (Formula VII). Entrectinib (trade name Rozlytrek) is administered to patients as a standard following a regime of 600 mg once daily, taken orally. In an embodiment of the invention, entrectinib is administered according to this regime. In another embodiment, 500 mg entrectinib is administered orally, once daily. In another embodiment, 400 mg entrectinib is administered orally, once daily. In another embodiment, 300 mg entrectinib is administered orally, once daily. In another embodiment, 200 mg entrectinib is administered orally, once daily. Entrectinib is preferably administered formulated in a capsule.

Alternatively, any one of the linear ALK inhibitors disclosed in WO 2008/073687 WO 2009/126514 or WO 2010/002655 (all incorporated herein by reference) may be used in the invention.

For each drug, suitable dosing schedules may be selected by the skilled physician, e.g. based on clinical studies or patient response to the drug. ALK inhibitors are currently known for oral administration, but alternative administration routes may be utilised as desired, e.g. intravenous administration. The ALK inhibitor for use according to the invention is preferably administered in the form of a pharmaceutical composition. Suitable pharmaceutical compositions may include liquid solutions or syrups, solid compositions such as powders, granules, tablets or capsules, and creams and ointments. Preferably each ALK inhibitor will be administered in the form for which it is licensed for use in treatment of $ALK^{Pos}$ NSCLC, as set out above.

Pharmaceutically-acceptable diluents, carriers and excipients for use in such compositions are well known in the art. For instance, suitable excipients include lactose, sodium starch glycolate, maize starch or derivatives thereof, stearic acid or salts thereof, vegetable oils, waxes, fats and polyols. Suitable carriers or diluents include carboxymethylcellulose (CMC), methylcellulose, microcrystalline cellulose, hydroxypropylcellulose, hydroxypropylmethylcellulose (HPMC), dextrose, trehalose, liposomes, polyvinyl alcohol, pharmaceutical grade starch, mannitol, lactose, magnesium stearate, sodium saccharin, talcum, cellulose, glucose, sucrose (and other sugars), magnesium carbonate, silica, gelatin, oil, alcohol, detergents and emulsifiers such as polysorbates. Stabilising agents, wetting agents, emulsifiers, sweeteners etc. may also be used.

In a preferred embodiment, the ALK inhibitors used according to the present invention are formulated with the excipients and suchlike for which their use has previously been approved. Such information can be found on the regulatory approvals for these drugs issued by the FDA or EMA.

The term "treatment" as used herein encompasses both curative treatment (or treatment intended to be curative) and palliative treatment (i.e. treatment designed merely to limit, relieve or improve the symptoms of the cancer or plasma cell-mediated disease).

In an embodiment, the ALK inhibitor used according to the present invention may be used as a monotherapeutic agent, e.g. for treatment of cancer or a plasma cell-mediated disorder. ALK inhibitors may be used in series according to the present invention. By this is meant that a first ALK inhibitor may be used for cancer treatment in a patient, which is subsequently discontinued (e.g. because the patient suffers an adverse reaction to the drug, or the cancer becomes resistant to the drug). Following discontinuation of administration of the first ALK inhibitor, a second (different) ALK inhibitor is then administered to the patient. This may also then be discontinued, and a third different ALK inhibitor administered (and so on). A similar principle may be applied if necessary to treatment of a plasma cell-mediated disorder.

In another embodiment the ALK inhibitor used according to the present invention forms one part of a combination therapy. For instance, in cancer treatment an ALK inhibitor may be used along with at least one additional anti-neoplastic drug or anti-neoplastic therapy. The additional anti-neoplastic drug/therapy is not an ALK inhibitor. Administration of an ALK inhibitor may, for instance, be combined with a traditional chemotherapy drug, with radiotherapy, hormone therapy or immunotherapy, or a second targeted/precision small molecule therapeutic, etc. In treatment of a plasma cell-mediated disease according to the present invention, an ALK inhibitor may be used in combination with a suitable second therapeutic molecule. For instance, in the treatment of an autoimmune disease, an ALK inhibitor may be used in combination with a drug used for treatment of autoimmune diseases, e.g. a non-steroidal anti-inflammatory drug (NSAID) or an immunosuppressant, such as a corticosteroid.

According to the invention, an ALK inhibitor may in particular be used in combination with a proteasome inhibitor in the treatment of $ALK^{Neg}LTK^{Pos}$ multiple myeloma. An ALK inhibitor for use according to the invention may be used in combination with any one of the proteasome inhibitors described above. For instance, ceritinib may be used in combination with bortezomib, carfilzomib or ixazomib.

The invention may be further understood by reference to the non-limiting examples below, and the figures.

FIGURE LEGENDS

FIG. 1: LTK knockdown results in ER stress.

The figure shows the effect of LTK knockdown on ER stress caused by protein hypersecretion. HeLa cells which encode inducibly expressible IgM (heavy and light chain) were transfected with control or LTK siRNA. After 72 h, cells were treated with mifepristone to induce IgM expression, followed by lysis (at the indicated times following induction) and immunoblotting against the indicated proteins.

FIG. 2: LTK allows cells to cope with high secretory load.

A, L363 cells were treated with 5 μM crizotinib and the expression of spliced vs non-spliced XBP1 and ATF4 was determined 4, 8 and 12 h post-treatment. Splicing of XBP1 and accumulation of ATF4 are signs of the induction of ER stress. B, Bortezomib-resistant L363aBTZ cells were treated with 5 μM crizotinib and the expression of spliced vs non-spliced XBP1 and ATF4 was determined at 4, 8 and 12 h post-treatment. C, HeLa cells expressing inducible IgM (heavy and light chain) were treated with mifepristone to induce IgM expression over a period of 2 weeks. Afterwards, cells were treated with 1 μM crizotinib for 24 h followed by lysis and immunoblotting against spliced XBP1 to measure ER stress. + and − indicate cells with or without mifepristone treatment, respectively. Induced cells are considered hypersecretory and non-induced cells have a normal level of secretion. Numbers above the blot show the quantification of densitometric measurements from three independent experiments ±SD. Note that hypersecretory cells exhibit a higher level of ER stress upon treatment with crizotinib. D, Comparison of LTK mRNA expression by quantitative PCR in HeLa cells that do not overexpress IgM versus cells with prolonged (14 days) IgM overexpression.

FIG. 3: $ALK^{Neg}LTK^{Pos}$ cells are susceptible to crizotinib treatment and undergo apoptosis.

The figure shows that inhibition of LTK in hypersecretory cells reduces their viability. In A, HeLa cells expressing inducible IgM (heavy and light chain) were treated with mifepristone to induce IgM expression over a period of 2 weeks. Afterwards, cells were treated with 1 μM crizotinib for 24 h followed by lysis and immunoblotting for caspase 3. The upper blot shows non-cleaved caspase 3 and the lower blot shows cleaved caspase 3. Cleavage of caspase 3 is indicative of apoptosis induction. + and − indicate cells with or without mifepristone treatment, respectively. B, Concentration-response curves for the effect of crizotinib treatment (24 h) on the viability of three different myeloma cell lines. Results are the means of three independent experiments. C, Expression levels of LTK and ALK mRNA in the indicated myeloma cell lines determined by qPCR.

FIG. 4: $ALK^{Neg}LTK^{Pos}$ cell lines are susceptible to ALK inhibitor treatment.

The figure shows concentration-response curves for the effects of ceritinib, alectinib, ensartinib, lorlatinib, entrectinib and crizotinib (24 hr treatment) on the viability of the myeloma cell lines L363 and AMO-1 and their bortezomib-resistant clones (L363-BTZ & AMO-1-BTZ). The Results are the means of 3 independent experiments. Note the concentration-dependent reduction of viability of myeloma cells.

FIG. 5: LTK regulates secretion; a linear ALK inhibitor reduces secretion.

The figure shows the effect of LTK inhibition by ceritinib on protein secretion. In A, HeLa cells expressing flag-tagged LTK were treated with 1 μM of crizotinib or ceritinib for 30 minutes. Afterwards, cells were lysed and immunoblotted against phosphorylated LTK, which is used as a surrogate for the active form of LTK. The lower blot shows the levels of total LTK in cells. B, HeLa cells were treated with 1 μM ceritinib for 30 minutes followed by fixation and staining for Sec31A to label ERES. Cells were imaged by confocal microscopy and ERES were counted using ImageJ. C, HeLa cells stably expressing mCherry-tagged mannosidase-II RUSH reporter. Cells were treated with biotin to release the reporter from the ER. After 20 min, a time point where most of the reporter has reached the Golgi, cells were fixed and immunostained for GM130 to label the Golgi apparatus. The images show representative examples of cells after 20 min of biotin addition, where crizotinib-treated cells exhibit less of the reporter in the Golgi region. The graph on the right shows the quantification with the ratio of reporter fluorescence (red) in the Golgi (green) area. D, IgA secreting AMO-1 cells were treated for 3 h with the indicated doses of crizotinib and the amount of IgA in cell supernatant was determined by ELISA.

FIG. 6: Multiple myeloma cells from patients are susceptible to crizotinib treatment.

The figure shows dose-response curves for the effect of crizotinib treatment (72 hr) on the viability of purified $CD138^+$ multiple myeloma cells isolated from seven patients as indicated. Viability was measured by CellTiter-Glo.

FIG. 7: LTK and ALK expression in multiple myeloma cells from myeloma patients.

A and B show Omics data derived from the CoMMpass study, IA-13 build. Data comprised 767 multiple myeloma samples (www.themmrf.org) from the Multiple Myeloma Research Foundation Personalized Medicine Initiatives (https://research.themmrf.org). RNA-seq data are represented as Fragments Per Kilobase of transcript per Million mapped reads, FPKM.

A. RNA-seq data from multiple myeloma cells of 767 patients in the CoMMpass study. Expression of LTK and secretory pathway genes such as ERGIC-53 (LMAN1), VIP36 (LMAN2), SURF4, BiP (HSP5A), the ALK gene and the negative control IL-2 are shown. IL-2 is not expressed in multiple myeloma cells (expression lies below the cut-off of FPKM=1, dotted line). Violin plots include medians (dashed line) and quartiles (dotted line).

B. Dotplot showing LTK vs. ALK expression of 767 patients. Dotted lines show expression cut-offs for LTK and ALK (FPKM=1).

FIG. 8: Xenografted human multiple myeloma cells in NSG mice are susceptible to crizotinib.

In this figure, immunocompromised NSG mice were intrafemorally injected with human L363-BTZ (bortezomib-resistant) myeloma cells. The cells were equipped with luciferase for in vivo monitoring of disease progression. After 10 days, mice were treated with bortezomib i.v. twice over a 7 day period and with crizotinib orally every day over the 7 day period. The images on the left show examples of tumour load in the different groups at days 4 and 7 of treatment (days 14 and 17 post tumour inoculation), and the graph on the right depicts the average luciferase signal for each mouse in each cohort (n=4) normalised to day 0 of the treatment (day 10 post tumour inoculation). Statistical significance between the groups was assessed with two-way ANOVA and between the time-points using one-way ANOVA with Tukey post-test.

FIG. 9: Expression of LTK and ALK in Chronic lymphocytic leukemia (CLL) cells.

Gene expression data from CLL cell samples of 107 patients were analysed for expression of LTK and ALK. 94 of 107 patients (88%) of CLL samples expressed LTK over the cut-off (dotted line), while none of the samples expressed ALK (right histogram), as shown.

FIG. 10: CLL cells from patients are susceptible to the linear ALK inhibitor crizotinib.

The Figure shows the response of activated proliferating CLL blasts in response to a linear ALK inhibitor.

Left: Dose response curves of CLL cells from 21 patients.

Middle: $IC_{50}$ values are displayed in a violin plot that shows 17 samples that are sensitive to Crizotinib. These are indicated as super-sensitive (CLL cells from 3 patients), highly sensitive (3 patients), and sensitive (11 patients).

Right: Drug sensitivity scores (DSS, Yadav et al. Scientific Reports 4: 5193, 2014) integrate multiple dose-response relationships in high-throughput compound testing studies. DSS of CLL samples demonstrate that a third of the patients have CLL cells that are highly sensitive to crizotinib.

FIG. 11: CLL cells from $IgVH^{Unmut}$ patients are susceptible to crizotinib.

CLL samples from FIG. 10 were divided in terms of mutational status of immunoglobulin variable heavy chain (IgVH) genes.

Left: Four of six patient samples that have $IgVH^{Unmut}$ CLL are highly sensitive to crizotinib. None of the $IgVH^{Unmut}$ samples showed low sensitivity.

Right: Three out of 15 $IgVH^{Mut}$ CLL samples are highly sensitive to crizotinib. One of these barely qualifies as mutated (CLL168 that has 97.9% homology). Four of the 15 $IgVH^{Mut}$ samples showed low sensitivity.

FIG. 12: CLL cells from patients are susceptible to ALK inhibitor treatment CLL cells from 12 patients were tested for responses to ALK inhibitor treatment with brigatinib, ceritinib, ensartinib, entrectinib and lorlatinib. Drug sensitivity scores (DSS, Yadav et al. Scientific Reports 4: 5193, 2014) are shown. A cut-off line is set at DSS=10, dotted line.

FIG. 13: Expression of LTK and ALK in B-cell differentiation.

This figure analyses expression of ALK and LTK in B-cell subsets in humans. In A, expression signals are shown for B-cell subsets: LTK expression (left plot) and ALK expression (right). LTK is expressed over cut-off in memory cells, plasmablasts and plasma cells. ALK is not expressed in the B-cell subsets.

B. RNA-seq data was downloaded from deposited RNA-seq and flow cytometry data for 29 immune cell types within the peripheral blood mononuclear cell (PBMC) fraction of healthy donors. Data showed naïve B-cells have low expression of LTK (18 of 105 were positive) and were negative for ALK. Memory B-cells and plasma cells were positive for LTK, and all negative for ALK. Memory B-cells and plasma cells were $ALK^{Neg}LTK^{Pos}$.

FIG. 14: In vitro-generated plasma cells were sensitive to crizotinib.

$CD19^+$ B-cells from 5 blood bank donors were stimulated by adherent murine L cells expressing CD40L, BAFF and April for 3 days to make B-cell blasts (plasma blasts/cells). plasma blasts/cells were tested for sensitivity to crizotinib for 72 h (CellTiterGlo).

Left: Relative percentage cell viability in drug-sensitivity profiles of 5 normal plasma blasts/cells treated with crizotinib.

Right: $IC_{50}$ of 5 normal plasma blasts/cells treated with crizotinib.

FIG. 15: In vitro-generated plasma cells are sensitive to the linear ALK inhibitors crizotinib and ceritinib.

Negatively selected normal B-cells from blood bank donors were stimulated with sCD40L, IL-21, IL-4 for 5 days. This protocol allows generation of 10-20% end differentiated plasma cells that express IRF4 and BLIMP1. From day 5-7, cells were exposed to titred crizotinib in A, or ceritinib in B.

In A and B, IRF4 vs BLIMP1 in gated $CD19^+$ B cells is shown. IRF4 and BLIMP1 double positive cells represent end stage plasma cells. Such plasma cells are gated (blue elliptic region) and percent plasma cells are shown. The conditions without inhibitor (0) and with linear Alk-inhibitor (crizotinib, A; ceritinib, B) are shown for concentrations 0.01 µM, 0.1 µM, 1 µM, 10 µM and 100 µM.

Panel C shows calculated percentage plasma cell viabilities in response to crizotinib and ceritinib doses as indicated.

FIG. 16: Plasma cells are sensitive to crizotinib in vivo and reduced the secretion of Ig in vitro.

$Luciferase^+$ L363wt plasma cell lines were injected intrafemorally into immunocompromised NSG mice. After 10 days, mice were treated with crizotinib (50 mg/kg, orally, daily) every day for 7 days.

Left: Plasma cell line is killed by crizotinib in xenografted mice. Mice were imaged on an IVIS optical imager on days 10, 14 and 17. Ventral aspects of 3 (of 4) mice are shown. Mice received vehicle (top) or crizotinib (bottom). Crizotinib dramatically reduced the signals from plasma cells in 3 of 4 mice.

Right: Secretion of Ig is reduced by ceritinib. The plasma cell line AMO-1 was washed and added to wells ($10^6$ cells/well) in the presence of titred ceritinib for 3 h. Supernatants were assayed for IgA secreted by the AMO-1 cells by use of the Human IgA ELISA Kit (Abcam, Cambridge, UK).

FIG. 17: Liver hepatocellular carcinoma are $ALK^{Neg}LTK^{Pos}$ and are sensitised to apoptosis by crizotinib.

RNA-seq data from 365 hepatocellular carcinomas (HCCs) were generated by The Cancer Genome Atlas (TCGA) and reported as FPKM (number of Fragments Per Kilobase of exon per Million reads). 365 patient samples from hepatocellular carcinomas were investigated for expression of LTK and ALK. In A, the left plot shows LTK vs ALK with cut-off as indicated by dotted line. All patients have samples that are $ALK^{Neg}$. About a quarter of the samples are $LTK^{Pos}$ and thereby $ALK^{Neg}LTK^{Pos}$.

In B, Hepatocellular carcinoma cells (HepG2) were treated with DMSO (untreated) or with increasing concentrations (1, 2 and 5 µM) of doxorubicin for 24 h and apoptosis was assessed by immunoblotting for cleaved caspase 3. Note that 5 µM doxorubicin only weakly induces cell death. Cells were also treated with the same concentrations of doxorubicin in the presence of 1 µM crizotinib for 24 h. Note that the presence of crizotinib renders HepG2 cells more sensitive to the apoptosis inducing drug doxorubicin indicating that providing a linear ALK inhibitor sensitises HCC cells to apoptosis.

EXAMPLES

Myeloma Experiments, Materials and Methods
Patient Samples and Primary Multiple Myeloma Cell Sample Processing Multiple myeloma patients were recruited from the Oslo Myeloma Centre at Oslo University Hospital. The study was approved by the regional Committee for Medical and Health Research Ethics of South-East Norway (REC#2016/947 and 2012/174); Bone marrow aspirates were obtained from multiple myeloma patients following signed informed consent in compliance with the Declaration of Helsinki.

Seven multiple myeloma patient samples were included. Patients were due for treatment after second relapse (patient number 1701), third relapse (2101, 2021, 1802, 9041, 2504) or fourth relapse (2201). All patients had received proteasome inhibitors (bortezomib or carfilzomib) in at least one line of treatment.

Bone marrow mononuclear cells (BMMCs) were prepared from patient bone marrow aspirates by Lymphoprep density gradient centrifugation. After CD8 depletion by Dynabeads (Life Technologies) BMMCs were subsequently stimulated by expanding Th cells in the presence of Human T-Activator CD3/CD28 Dynabeads (Life Technologies) and 100 U/ml human interleukin-2 (hIL-2, Roche, Mannheim, Germany). After 48 h, BMMCs were subjected to CD138+ enrichment to isolate multiple myeloma plasma cells using MACS CD138+ microbeads (Milteny Biotec, Bergisch Gladbach, Germany).

Drug Treatment and Cell Viability Assay (Multiple Myeloma Patient Cells)

CD138+ multiple myeloma cells (5,000-10,000 cells/well) from activation assays were tested in 384-well plates for their response to crizotinib. 6 crizotinib concentrations were tested, in 10-fold dilutions covering a 0.1-10,000 nM concentration range (plates dispensed by an Echo acoustic dispenser, LabCyte Inc., San Jose, CA, USA).

The plate was incubated in a humidified environment at 37° C. and 5% $CO_2$. Cell viability was determined after 72 hr using the CellTiterGlo (Promega, Madison, WI, USA) ATP assay according to the manufacturer's instructions and using an Envision Xcite plate reader (Perkin Elmer, Shelton, CT, USA). Relative percentage (%) cell viability was calculated by normalising luminescence units for each well to negative controls (DMSO 0.1%) and positive control wells (100 µM BzCl) and curve-fitting conducted to obtain $IC_{50}$ values.

Cell Culture and Transfections

HeLa cells were cultured in DMEM (GIBCO) supplemented with 10% FCS and 1% Penicillin/Streptomycin (GIBCO). For overexpression of plasmids, cells were transfected using either Fugene 6 or with TransIT-LT1 (Mirus). For knockdown experiments, cells were reverse transfected with 10 nM siRNA (final concentration) using HiPerfect (Qiagen) according to the manufacturer's instructions.

Cell Lysis and Immunoblotting

Cells were washed twice with PBS and collected in lysis buffer (50 mM Tris-HCl, pH7.4; 1 mM EDTA, 100 mM NaCl, 0.1% SDS and 1% NP-40) supplemented with proteinase and phosphatase inhibitor (Pierce Protease and Phosphatase Inhibitor Mini Tablets, EDTA-free). Lysates were incubated on ice for 10 minutes followed by clearing centrifugation at 20,000×g at 4° C. for 10 min. Supernatants were transferred into fresh tubes and reducing loading buffer was added. Lysates were subjected to SDS-PAGE and transferred onto a nitrocellulose membrane using semi-dry transfer. The membrane was blocked (in ROTI buffer (Roth) or 5% milk in PBS with 0.1% tween) and probed with the appropriate primary antibodies. Subsequently membranes were incubated with horseradish peroxidase-conjugated secondary antibody. Immunoblots were developed using a chemiluminescence reagent (ECL clarity, BioRad) and imaged using ChemiDoc (BioRad).

Multiple Myeloma Cell Lines, Cell Culture and Viability Assays

The cell lines used were the human multiple myeloma cell lines L363 (DSMZ catalogue number ACC 49), AMO-1 (DSMZ catalogue number ACC 538) and ARH-77 (ATCC CRL-1621).

Multiple myeloma cell lines were maintained in RPMI-1640 culture medium (Sigma-Aldrich, Buchs, Switzerland) supplemented with 10% heat-inactivated fetal bovine serum (FBS), 100 µg/ml streptomycin and 100 U/ml penicillin/streptomycin (Sigma-Aldrich, Buchs, Switzerland). The bortezomib-resistant cell lines were established and maintained from their parental cell line by continuous drug exposure>12 months to their parental cell lines (Soriano et al, Leukemia 30: 2198-2207, 2016).

The viability of the cells was determined 24 hr post treatment using Cell Counting Kit-8 (CCK-8; MedChemExpress, NJ, USA) according to the manufacturer's instructions.

Gene Expression Analysis

Omics data were downloaded from the CoMMpass[SM] study, IA-13 build and comprised 767 multiple myeloma samples (www.themmrf.org). These data were generated as part of the Multiple Myeloma Research Foundation Personalized Medicine Initiatives (https://research.themmrf.org). RNA-seq data were represented as Fragments Per Kilobase of transcript per Million mapped reads, FPKM. FKPM<1 was considered negative.

RNA Isolation and RT-PCR (s/u XBP1 and ATF4 Induction)

Total RNA was isolated from cell lines using Trizol (Ambion/Thermo Fisher Scientific, MA, USA) and Directzol RNA MiniPrep (Zymo Research, CA, USA). 500 ng of total RNA was reverse transcribed using High Capacity cDNA Reverse Transcription kit (Applied Biosystems/Thermo Fisher Scientific, MA, USA) according to the manufacturer's instructions. Subsequently, 10 ng of cDNA was used per qPCR reaction with 2× PowerUp SYBR Green Master Mix (Applied Biosystems/Thermo Fisher Scientific, MA, USA) and the following primers: spliced, unspliced and total XBP1 and ATF4 (Oslowski & Urano, Methods in Enzymology 490: 71-92, 2011), and GAPDH as a housekeeping gene control on a QuantStudio5 Real-Time PCR system (Applied Biosystems/Thermo Fisher Scientific, MA, USA).

ELISA $1×10^6$/ml IgA-secreting AMO-1 cells were seeded in fresh medium with increasing doses of compounds of interest for 3 hr. Subsequently, the medium was collected, diluted 20-fold and a Human IgA ELISA Kit (Abcam, UK; product number ab137980) was used to determine the level of IgA antibody in the cell culture supernatant, according to the manufacturer's instructions.

In Vivo Experiments

NSG (NOD-scid IL2Rgamma$^{null}$) mice were obtained from The Jackson Laboratory (No. 005557, CA, USA) and kept in isolated ventilated cages with food ad libitum. Age matched (6-8 weeks old) mice were injected with $0.5 \times 10^5$ L363-BTZ_Luc+_TdTomato+ multiple myeloma cells (equipped with luciferase vector for monitoring, obtained from Addgene: #72486) into the right femur. Tumour growth was monitored twice over the week following luciferin injection (150 mg/kg, obtained from BioVision, CA, USA). 10 days post tumour inoculation, treatment was initiated with crizotinib (50 mg/kg, orally, daily), bortezomib (1 mg/kg, i.v. twice over 7 days) or with vehicle, for 7 days. The study was carried out in accordance with the 3Rs principle. Experiments were approved by the Committee for Animal Experiments (St Gallen, Switzerland), application no. 30177. Bortezomib and crizotinib were purchased from MedChem Express, NJ, USA.

CLL Experiments, Materials and Methods

Gene Expression Data

Gene expression data for CLL cells were obtained by analysis of previous data sets obtainable at http://www.genomicscape.com/microarray platform. Data from CLL cells of 107 CLL patients were analysed for the expression of LTK and ALK genes. Data were from the Herold, chronic lymphocytic leukemia, HGU133P (107 samples) dataset from the Affymetrix Human Genome U133 Plus 2.0 Array (Herold et al., Leukemia 25(10): 1639-45, 2011), normalised with Robust Multiarray Averaging (RMA).

Dose Response Experiments for CLL Samples

CLL cells from patients were stimulated by adherent murine L cells expressing CD40L, BAFF and April for 24 h. The L cells were then removed by immuno-magnetic separation. Washed CLL cells were plated into 384-well plate format (10,000 cells/well) and tested against crizotinib at 5 concentrations in 10-fold dilutions (plates dispensed by an Echo acoustic dispenser, LabCyte Inc., San Jose, CA, USA). The plate was incubated in a humidified environment at 37° C. and 5% $CO_2$. Cell viability was determined after 72 h using the CellTiter-Glo (Promega, Madison, WI, USA) ATP assay according to the manufacturer's instructions and using an Envision 2102 Multilabel reader (PerkinElmer, Shelton, CT, USA). Relative percentage cell viability was calculated by normalising luminescence units for each well to negative (DMSO 0.1%) and positive (100 µM BzCl) control wells. Curve fitting was conducted to obtain $IC_{50}$ values.

Quantitative scoring of differential drug sensitivity for individual drugs was calculated as drug sensitivity scores (DSS values, Yadav et al., Scientific Reports 4: 5193, 2014). DSS values were calculated for integrated multiple dose-response relationships in high-throughput compound testing as shown.

Gene Expression Analysis for Human B-Cells

Gene expression data for B-cell differentiation in humans were obtained by analysis of data sets obtainable at http://www.genomicscape.com/microarray platform. The GEP Dataset was derived from human plasma cell differentiation, normalised by MAS5 on the Affymetrix Human Genome U133 Plus 2.0 Array (Jourdan et al., Leukemia 28(8): 1647-56, 2014; Jourdan et al., Journal of Immunology 187(8): 3931-41, 2011; Jourdan et al., Blood 114(25): 5173-81, 2009; Caron et al., Journal of Immunology 182(12): 7595-602, 2009).

Data from donors were analysed for the expression of LTK and ALK genes in B lymphopoiesis of humans. B-cells were sorted into subsets as follows: 1. naive B-cells (n=5); 2. centroblasts (n=4); 3. centrocytes (n=4); 4. memory B-cells (n=5); 5. preplasmablasts (n=5); 6. plasmablasts (n=5); 7. early plasma cells (n=5); 8. bone marrow plasma cells (n=5).

RNA-seq data was downloaded from deposited data (Monaco et al., Cell Reports 26(6): 1627-40, 2019). Data were analysed for 29 immune cell types within the peripheral blood mononuclear cell (PBMC) fraction of healthy donors using RNA-seq and flow cytometry. Data from naïve B-cells were from Schmiedel et al., Cell 175(6): 1701-15, 2018).

Drug Sensitivity Screens Activated B-Cell Blasts/Plasma Cells $CD19^+$ B-cells from 5 blood bank donors were stimulated by adherent murine L cells expressing CD40L, BAFF and April for 3 days to make B-cell blasts (plasma blasts/cells). Washed plasma blasts/cells were detached and plated into 384 well format (10,000 cells/well) and tested against crizotinib at 6 concentrations in 10-fold dilutions covering a $10^{-3}$-10 µM concentration range. Cell viability was determined after 72 h using the CellTiterGlo. Relative percentage cell viability was calculated by normalising luminescence units for each well to negative controls (DMSO 0.1%) and positive control wells (100 µM BzCl) and curve-fitting conducted to obtain the $IC_{50}$.

Results

LTK is a Regulatory Node in the Proteostasis Network

Mathematical modeling suggested that LTK is a positive regulator of ER export that is activated by secretory flux. To validate this prediction experimentally, HeLa cells which inducibly express IgM were used (Bakunts et al., supra). Induction of IgM expression for 24 hours resulted in a mild activation of the UPR (which is a marker of ER stress), as indicated by the rise of XBP1s levels (FIG. 1). When LTK expression was silenced, cells responded with higher levels of ER stress upon induction of IgM expression (FIG. 1). This confirms that LTK is a regulatory node of the proteostasis network.

LTK Helps Multiple Myeloma Cells Cope with Elevated Secretory Load

Multiple myeloma is characterised by secretion of excessive amounts of immunoglobulins. To determine whether LTK inhibition induces ER stress in multiple myeloma cell lines, L363 cells were treated with crizotinib, a compound which has previously been shown to inhibit LTK and its effects on secretion (Centonze et al., supra). Crizotinib treatment induced ER stress as evident by increased splicing of XBP1 and induction of ATF4 (FIG. 2A). A similar observation was made in L363-BTZ cells that are resistant to bortezomib (FIG. 2B). Of note, L363 cells as well as their bortezomib-resistant clones are positive for LTK, but negative for ALK (see below), minimising the possibility of an off-target effect of crizotinib.

To test whether LTK helps cells adapt to high secretory cargo load a system was used that allows direct comparison of the same cells with or without excessive secretion. Rather than using pulsed induction of IgM production and secretion for only short periods of time, IgM production was induced for 14 days, in order to take into account potential adaptive cellular mechanisms to chronic overexpression of secretory proteins. HeLa cells induced to overexpress IgM for 14 days were compared to non-induced HeLa cells. Treatment of non-induced cells with the LTK inhibitor crizotinib did not result in any appreciable increase in ER stress (FIG. 2C), whereas cells that experienced increased secretory burden for prolonged periods of time exhibited a 2.5-fold higher level of ER stress (FIG. 2C). The heightened dependency of hypersecretory cells on LTK is in line with the observation that hypersecretory cells exhibit a 4-fold increase in LTK expression (FIG. 2D).

Targeting LTK Reduces the Viability of Multiple Myeloma Cells

The observation that LTK inhibition induces ER stress in hypersecretory cells prompted the inventor to test whether it would also cause cell death. The effects of crizotinib on caspase 3 cleavage in HeLa cells with or without IgM hypersecretion were investigated. Non-secretory cells did not show any apoptotic response to crizotinib treatment (FIG. 3A), which is in line with the observation that these cells did not respond with ER stress. However, cells with chronic increase of secretory burden showed a marked increase in apoptosis upon crizotinib treatment (FIG. 3A). Two multiple myeloma cell lines (L363 and ARH77) were then treated with crizotinib, and clear reductions in cell viability were observed at pharmacologically relevant drug concentrations. The same was found to be the case with a bortezomib-resistant clone of L363 (FIG. 3B). Of note, these cells are positive for LTK but are negative for ALK (FIG. 3C), as were multiple myeloma cells obtained from patients (see below).

Similarly to crizotinib, other linear ALK inhibitors, such as ceritinib, alectinib, ensartinib and entrectinib, were found to display cytotoxic activity against multiple myeloma cells (FIG. 4, left panels). The cyclic ALK inhibitor lorlatinib did not efficiently kill myeloma cells. The following $IC_{50}$ values (in µM) were obtained for ceritinib in the tested cell lines: 1.03 in L363, 0.79 in L363-BTZ, 2.09 in AMO-1 and 2.77 in AMO-1-BTZ. The following $IC_{50}$ values (in µM) were obtained for crizotinib in the tested cell lines: 3.323 in L363, 4.15 in L363-BTZ, 3.92 in AMO-1 and 6.477 in AMO-1-BTZ. The following $IC_{50}$ values (in µM) were obtained for alectinib in the tested cell lines: 6.12 in L363, 6.22 in L363-BTZ, 13.31 in AMO-1 and 17.6 in AMO-1-BTZ. A similar sensitivity to LTK inhibition was observed with the bortezomib-resistant versions of L363 and AMO-1 (FIG. 4, right). This suggests that LTK acts on a proteasome-independent part of the proteostasis network, and that proteasome inhibitor resistance in multiple myeloma may be overcome by inhibiting LTK. This can be achieved by using approved ALK-inhibiting drugs.

In terms of mechanism, linear ALK inhibitors such as ceritinib inhibit LTK (FIG. 5A), which inhibits ER-to-Golgi trafficking (FIG. 5B, C) and consequently also inhibits immunoglobulin secretion (FIG. 5D).

The effect of crizotinib was then tested on primary myeloma cells obtained from relapsed patients who were at the $3^{rd}$-$5^{th}$ line of therapy. CD8-depleted bone marrow-derived mononuclear cells were stimulated by anti-CD3/CD28 beads in IL-2. This strategy stimulated CD4+ helper T cells (Th cells) that provide support for multiple myeloma cell activation. After 48 hr, CD138+ multiple myeloma cells from each of 15 patients were transferred to wells in the presence of titrated crizotinib, and concentration-response curves were calculated (FIG. 6). LTK inhibition had a striking effect on all patient-derived multiple myeloma cells, and $IC_{50}$ levels were between 0.8-5 µM. Notably, analysis of a cohort of 767 patients with multiple myeloma showed that the mean expression level of LTK mRNA was 8.18, while that of ALK was 0.02 (FIG. 7A), below the cut-off ($10^0$). The patients were divided into the following categories: myeloma cells that were $Alk^{Neg}LTK^{Pos}$ were found in 636 of 767 patients (83%); myeloma cells that were $Alk^{Neg}LTK^{Neg}$ in 130 of 767 patients (17%); and $Alk^{Pos}LTK^{Pos}$ myeloma in only 1 of 767 patients (0.001%) (FIG. 7B). Since the ALK inhibitors lack ALK as a target, the killing of primary myeloma cells with crizotinib is likely a result of LTK inhibition.

The in vivo effect of crizotinib on multiple myeloma cells was then tested. To this end, bortezomib-resistant L363 cells engineered to express luciferase were injected into the femurs of immunocompromised mice. To facilitate monitoring of tumour growth in vivo, cells were engineered to express luciferase. This model takes into account both the special biology of proteasome inhibitor-resistant multiple myeloma cells as well as the protective and drug resistance-facilitating features of the bone marrow microenvironment that are critical for multiple myeloma biology in vivo. Treatment with crizotinib was commenced at a stage where tumours were readily detectable (at 10 days after tumour inoculation), mimicking the clinical situation. Mice were also treated with bortezomib, which was not expected to have any effect given that bortezomib-resistant L363 cells were used, but confirmed proteasome inhibitor resistance. Mice were administered crizotinib orally daily for 7 days (50 mg/kg). Bortezomib was administered intravenously twice (1 mg/kg) over the period. Treatment with crizotinib caused a reduction in tumour burden relative to the baseline, as well as to the untreated control and bortezomib-treated mice (FIG. 8). This shows that treatment with an inhibitor of LTK can overcome proteasome inhibitor resistance in multiple myeloma.

Primary CLL Cells are $ALK^{Neg}LTK^{Pos}$

Turning to chronic lymphocytic leukemia (CLL), we investigated the transcription of ALK and LTK and found that 94 out of 107 CLL cell samples (88%) were $LTK^{Pos}$ and that all 107 samples were $ALK^{Neg}$ (FIG. 9). CLL is therefore a cancer where a majority of patients have $ALK^{Neg}LK^{Pos}$ CLL cells. CLL is a cancer where leukaemic cells in the blood are quiescent or pre-apoptotic. CLL cell divisions occur in a specialised microenvironment in the lymph node, spleen or in the bone marrow. Here dividing CLL blast cells are juxtaposed to stimulatory cells in the microenvironment (so-called pseudofollicles) that support blastogenesis and mitosis. In this stage, CLL cells are hypersecretory, secreting monoclonal antibodies before undergoing cell division (Darwiche et al., supra).

Primary CLL Cells are Sensitive to Linear ALK Inhibitors

Microenvirionmental factors that are important for CLL cell activation (Patten et al., Blood 111: 5173-5181, 2008; Bagnara et al., Blood 117: 5463-5472, 2011; Hall et al., Blood 105: 2007-2015, 2005; Os et al., Cell Reports 4(3): 566-577, 2013) were provided and proliferating CLL blasts were tested for sensitivity to linear ALK inhibitors. We found that 17 of 21 patient samples (81%) had CLL cells that were sensitive to the linear ALK inhibitor crizotinib (FIG. 10). Of these, 11 were normally sensitive ($IC_{50}$<2 µM,), 3 were highly sensitive ($IC_{50}$<$2\times10^{-1}$ µM) and 3 were super-sensitive ($IC_{50}$<$10^{-2}$ µM). Further integrating multiple dose-response relationships in our high-throughput compound testing, we found that drug sensitivity scores (DSS) demonstrated that a third of the patients have CLL cells that were highly sensitive to crizotinib.

Poor Prognosis Patients More Often have CLL Cells Sensitive to Linear ALK Inhibitors CLL is divided into two subtypes depending upon mutation load of the V regions of the immunoglobulin variable genes of the heavy chain (IgVH) as detailed above. The IgVH unmutated subtype has poor prognosis, while the IgVH mutated (<98% homology to germline) is found in indolent CLL with better prognosis. The results showed that the poor prognosis subtype had a higher response rate and sensitivity to linear ALK inhibitors (FIG. 11). This suggests that linear ALK inhibitors are especially relevant for treatment of the IgVH unmutated, poor prognosis subtype.

CLL cells from 12 new patients were tested for susceptibility to ALK inhibitors. Nearly all patients had CLL cells that showed susceptibility to ceritinib, crizotinib, ensartinib and entrectinib (when using a cut-off of DSS=10, the results are 11/12, 10/12, 11/12, 12/12), as shown in FIG. 12. Brigatinib inhibited CLL cells from 4/12 patients, lorlatinib inhibited CLL cells from 0/12 patients.

Normal Memory B-Cells, Plasmablasts and Plasma Cells are $ALK^{Neg}LTK^{Pos}$

We next turned to normal B-cells and the B-cell differentiation lineage that includes naïve mature B-cells, germinal centre centroblasts, germinal centre centrocytes, memory B-cells, pre-plasmablasts, plasmablasts, early plasma cells and bone marrow plasma cells. Gene expression (array based) and RNA sequencing demonstrated that memory B-cells plasmablasts and plasma cells all expressed LTK, but not ALK (FIG. 13). Memory B-cells, plasmablasts and plasma cells are therefore $ALK^{Neg}LTK^{Pos}$.

Normal Memory B-Cells, Plasmablasts and Plasma Cells are Sensitive to Linear ALK Inhibitors Activated B-cells become B-cell blasts after 3 days. Such enlarged cells secrete high levels of antibody and are therefore hypersecretory. Stimulated day 3 B-cells were cultured for 3 further days with linear ALK inhibitor. All samples had a similar sensitivity with an $IC_{50}$ between 1 and 1.5 µM for crizotinib (FIG. 14). Results suggest that at least half of blastoid B-cells (memory B-cell blasts, plasmablasts and plasma cells) are killed within 3 days of treatment. To further investigate the sensitivity of cell subtypes, we stimulated B-cells for 5 days to allow plasma cells to develop. End stage plasma cells typically express IRF4 and BLIMP1 (FIG. 15) and secrete high levels of antibody. Exposure to linear ALK inhibitor (crizotinib or ceritinib) efficiently killed plasma cells with high sensitivity. Plasma cells responded with an $IC_{50}$ of 0.8 µM (crizotinib) and <0.001 µM (ceritinib) demonstrating that plasma cells were very sensitive to linear ALK inhibitors. A reduction of all other activated B-cell subsets and plasmablasts were seen, but plasma cells were most sensitive to linear ALK inhibitors and plasma cells were supersensitive to ceritinib.

Crizotinib Kills Plasma Cells in Xenografted NSG Mice

We injected $ALK^{Neg}LTK^{Pos}$ plasma cell cell lines intrafemorally into NSG mice. Treatment of mice with crizotinib reduced plasma cell density (FIG. 16, luciferase dependent signals, in optical IVIS imaging) demonstrating that plasma cell cell lines also could be inhibited in vivo.

Ceritinib Inhibits Secretion of Antibodies by Plasma Cells In Vitro

We tested if plasma cell secretion was inhibited by linear ALK inhibitor (FIG. 16). Three hour exposure reduced the levels of secreted immunoglobulin from plasma cell cell lines suggesting blockade of ER→Golgi trafficking as demonstrated in FIG. 5A-C.

Hepatocellular Carcinoma (HCC) Cells were $ALK^{Neg}LTK^{Pos}$ and Sensitive to Crizotinib RNA-seq data from 365 HCCs revealed that all patients had HCC samples that are $ALK^{Neg}$. About a quarter of the samples were $LTK^{Pos}$ and thereby $ALK^{Neg}LTK^{Pos}$. We found that cells from the well-differentiated HOC cell line HepG were sensitive to the linear ALK inhibitor crizotinib in experiments where this drug acted in synergy with doxorubicin, a cytostatic drug (FIG. 17). Thus crizotinib sensitised the HepG HCC cells to apoptosis.

The invention claimed is:

1. A method of treating a subject suffering from:
    (i) an anaplastic lymphoma kinase (ALK)-negative and leukocyte tyrosine kinase (LTK)-positive ($ALK^{Neg}LTK^{Pos}$) cancer selected from multiple myeloma or chronic lymphocytic leukaemia; or
    ii) a plasma cell-mediated disease mediated by $ALK^{Neg}LTK^{Pos}$ Pos plasma cells, selected from an autoimmune disease or graft versus host disease (GVHD),
    wherein said cancer or plasma cell-mediated disease is characterised by antibody hypersecretion by said $ALK^{Neg}LTK^{Pos}$ cancer or plasma cells,
    said method comprising administering to said subject a pharmaceutically-effective dose of an ALK inhibitor selected from ceritinib, brigatinib, crizotinib, ensartinib, alectinib and entrectinib.

2. The method of claim 1, wherein said cancer is multiple myeloma.

3. The method of claim 1, wherein said cancer is chronic lymphocytic leukaemia.

4. The method of claim 1, wherein said cancer is resistant to treatment with a proteasome inhibitor.

5. The method of claim 4, wherein said proteasome inhibitor is bortezomib.

6. The method of claim 1, wherein said autoimmune disease is lupus or immune thrombocytopenia.

7. The method of claim 1, wherein said treatment comprises daily administration of a dose comprising 450 mg ceritinib, and said dose is administered orally.

8. The method of claim 1, wherein said treatment comprises daily administration of a dose comprising 200 mg to 400 mg ceritinib, and said dose is administered orally.

9. The method of claim 1, wherein said treatment is for multiple myeloma, and wherein said treatment comprises daily administration of a dose comprising 400 mg to 500 mg ceritinib, and said dose is administered orally.

10. The method of claim 1, wherein said subject is a human.

11. A method of diagnosing and treating a subject suffering from an anaplastic lymphoma kinase (ALK)-negative and leukocyte tyrosine kinase (LTK)-positive ($ALK^{Neg}LTK^{Pos}$) cancer selected from multiple myeloma or chronic lymphocytic leukemia, wherein said cancer is characterised by antibody hypersecretion by said $ALK^{Neg}LTK^{Pos}$ cancer cells, comprising:
    (i) diagnosing cancer in said subject;
    (ii) testing said cancer for expression of ALK and LTK; and
    (iii) when said cancer is found to be ALK-negative and LTK-positive, administering a pharmaceutically-effective dose of an ALK inhibitor selected from ceritinib, brigatinib, crizotinib, ensartinib, alectinib and entrectinib to said subject.

12. A method of diagnosing and treating a subject suffering from an anaplastic lymphoma kinase (ALK)-negative and leukocyte tyrosine kinase (LTK)-positive ($ALK^{Neg}LTK^{Pos}$) cancer selected from multiple myeloma or chronic lymphocytic leukaemia, wherein said cancer is characterised by antibody hypersecretion by said $ALK^{Neg}LTK^{Pos}$ cancer cells, comprising:
    (i) diagnosing cancer in said subject;
    (ii) determining that said cancer is ALK-negative and LTK-positive; and administering to said subject an ALK inhibitor selected from ceritinib, brigatinib, crizotinib, ensartinib, alectinib and entrectinib in an amount effective to treat said cancer.

\* \* \* \* \*